(12) United States Patent
Doner

(10) Patent No.: US 6,873,962 B1
(45) Date of Patent: *Mar. 29, 2005

(54) TRAIN CORRIDOR SCHEDULING PROCESS

(75) Inventor: John R. Doner, Melbourne, FL (US)

(73) Assignee: GE-Harris Railway Electronics LLC, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/475,566

(22) Filed: Dec. 30, 1999

(51) Int. Cl.[7] .............................................. G06F 17/60
(52) U.S. Cl. .............................. 705/7; 705/8; 701/19; 701/20
(58) Field of Search ............................... 705/7, 8, 5, 6, 705/9; 701/19, 20, 117, 116; 246/187, 182 R, 182 C, 5, 2 R

(56) References Cited

U.S. PATENT DOCUMENTS

| | | | | |
|---|---|---|---|---|
| 4,122,523 A | * | 10/1978 | Morse et al. | 701/117 |
| 4,179,739 A | * | 12/1979 | Virnot | 246/182 R |
| 5,177,684 A | | 1/1993 | Harker et al. | 701/117 |
| 5,440,489 A | * | 8/1995 | Newman | 340/994 |
| 5,487,516 A | * | 1/1996 | Murata et al. | 246/182 C |
| 5,794,172 A | * | 8/1998 | Matheson et al. | 701/117 |
| 5,802,492 A | * | 9/1998 | DeLorme et al. | 340/990 |
| 5,828,979 A | * | 10/1998 | Polivka et al. | 701/117 |
| 5,936,517 A | | 8/1999 | Yeh | 340/435 |
| 6,125,311 A | * | 9/2000 | Lo | 701/29 |
| 6,135,396 A | * | 10/2000 | Whitfield et al. | 246/167 R |
| 6,223,125 B1 | * | 4/2001 | Hall | 701/117 |

FOREIGN PATENT DOCUMENTS

| | | | | |
|---|---|---|---|---|
| DE | 4108671 A | * | 9/1992 | B61L/3/00 |
| DE | 195 40 834 A1 | | 10/1995 | |

OTHER PUBLICATIONS

Cai, X. et al, Greedy Heuristics for Rapid Scheduling of Trains on a Single Track, May 1998, IIE Transactions, vol. 30 No. 5, start p. 481 [DIALOG, File 148].*

* cited by examiner

Primary Examiner—Romain Jeanty
Assistant Examiner—Andre Boyce
(74) Attorney, Agent, or Firm—Carl A. Rowold; John L. DeAngelis, Jr.; Beusse Brownlee Wolter Mora & Maire, P.A.

(57) ABSTRACT

A process for scheduling the travel of trains on a rail corridor. The rail corridor includes a plurality of siding tracks onto which trains can be sided when a meet or pass occurs with another train on the corridor. A gradient search process is used with a cost function to determine the optimum schedule by moving each meet and pass to a siding. The individual train schedules are varied by changing train speed and/or the train departure time (i.e., the time at which the train enters the corridor).

23 Claims, 16 Drawing Sheets

TRAIN CORRIDOR SCHEDULING PROCESS

FIELD OF THE INVENTION

This invention relates to a process for scheduling the movement of trains over a corridor having a plurality of sidings or parallel tracks with crossover switches.

BACKGROUND OF THE INVENTION

A rail corridor is a collection of tracks and sidings connecting two rail terminal areas. An example of a rail corridor 8 is shown in FIG. 1, showing a single main track and three sidings 20. The western end of the rail corridor is on the left side of FIG. 1 and the eastern end on the right.

Scheduling rail transportation on a rail corridor is particularly complex as compared to highway, water, or air transportation. Trains using a single track traveling in opposite directions (i.e., a meet) or trains traveling in the same direction (i.e., a pass) must meet in the vicinity of a siding so that one train can be sided to let the other pass. Alternatively, if there exists a double main line with crossover switches, one train can be switched to the second main line to allow the other train to pass. Also, when such meets or passes occur at a siding, the siding chosen must be long enough to accommodate the train to be sided, and the train to be sided must arrive at the siding and have sufficient time to pull onto the siding before the passing train arrives at the siding.

The railroad must earn revenue from its transportation operations, and some of this revenue is generally at risk if trains cannot deliver freight on time. The destination time of the trains must be managed insofar as possible to prevent late penalties incurred by the railroad. Therefore scheduling trains across a rail corridor involves arranging meets and passes as required for all trains, and while also meeting the schedule for each train so that they all arrive, on time, at the end of the corridor.

Commercially applied scheduling processes attempted to date have been based on paradigms which involve simulation with branch and bound techniques to find a conflict-free schedule. Since a branch and bound process must sort through many binary choices as it proceeds toward a solution, these techniques are slow, and do not take advantage of quantitative relationships that can be adduced from the scheduling context.

Additionally, the prior art technique search processes actually become more complex and take longer to arrive at a solution as the number of sidings in the rail corridor increases. This is due to the search algorithms that form the basis for these prior art techniques. More sidings requires the search algorithm to search through and consider more choices before arriving at an optimum solution. As will be shown below, the technique of the present invention overcomes this disadvantage. Since the present invention calculates a cost function where each siding represents a lower cost, having more sidings will make it easier for the algorithm to identify the optimal (i.e. minimal) cost.

One prior art technique uses quantitative information such as train speed, destination, and time of departure as discrete variables in an artificial intelligence based system. The artificial intelligence process involves rules that are used to search through the trial cases until the best case is found. In addition to the considerable time taken by an artificial intelligence system to optimize a solution, it is also known that a slight change to the initial conditions may produce a significantly different result. In any case, a slight change to the initial conditions will require a new and lengthy computation to find the optimum solution. A commercial product referred to as The Movement Planner, offered by GE-Harris Railway Electronics L.L.C. of Melbourne, Fla., implements such an artificial intelligence solution.

As can be seen, the total set of parameters for scheduling a corridor can be large, and of both discrete and continuous types. Generally, a cost function based on these parameters can be formulated, and then some method of search is executed that will reduce the cost and/or find a feasible schedule for the subject trains. But, the presence of discrete variables in the search space prevents or greatly complicates the application of any "hill-climbing" search processes based on the use of gradients

SUMMARY OF THE INVENTION

Cost functions that are everywhere differentiable have the advantage over prior art artificial intelligence solutions of being amenable to gradient-based minimization algorithms that do not have to accommodate the difficulties that arise in discrete or partially discrete search spaces. The present invention is a process whereby a rail corridor and the train schedule along that corridor can be characterized by a differentiable (i.e., continuous) cost function, so that a search process based on differentiation may be applied to scheduling train activity in the corridor.

The present invention is an analytical process for scheduling trains across a corridor that is driven by a cost function to be minimized, where the cost function is a continuous and differentiable function of the scheduling variables. The present invention is an improvement over the prior art cost functions that include discrete variables and thus are not differentiable everywhere. The present invention will permit the use of search processes relying on gradients, and as such, will converge to solutions much more quickly than the prior art scheduling processes involving simulation, or searching through discrete options.

The corridor scheduling process of the present invention involves three steps for identification of the optimum schedule. After an acceptable differentiable cost function is derived, the first step is the gradient search process wherein the gradient of the differentiable cost function is determined. The cost function is a sum of individual localizer functions. For each pair of trains in the corridor that might intersect, using the localizer function, the intersection point is identified as having a high value if the train trajectories do not intersect near a siding and lower values as the intersection point moves toward any siding. The gradient process may not move all intersection points precisely to the center of sidings dependent upon the selected threshold value and parametric values of the localizer function. Instead, the gradient process varies train departure times so that the set of all intersection points of trains are moved nearer to sidings. The second phase of the process simply moves the points precisely to the centers of sidings, selects which train to side, and computes exact arrival and departure times for the trains at the siding to assure the physical integrity of the meet. In order to center the intersection points at sidings and side specific trains, the speeds of the individual trains must be modified. This is accomplished during the second step of the scheduling process.

The third step maintains the proper siding relationships between any two meeting trains, as determined in step two, but allows the meet time to vary in an effort to assure that no train exceeds an upper speed limit. This final phase is again a gradient search process applied to all of the meet points determined in the second step.

BRIEF DESCRIPTION OF THE DRAWINGS

The present invention can be more easily understood, and the further advantages and uses thereof more readily apparent, when considered in view of the description of the preferred embodiments and the following figures. Identical reference characters in the figures refer to identical components of the invention.

FIGS. 18A and 18B through FIGS. 24A and 24B illustrate certain infeasibilities created by centering meets on sidings and the resolution thereof;

FIGS. 24A and 24B show the resolution of upward-resolvable siding conflicts;

DESCRIPTION OF THE PREFERRED EMBODIMENTS

Before describing in detail the train corridor scheduling process in accordance with the present invention, it should be observed that the present invention resides primarily in a novel scheduling process algorithm and not in the particular detailed configurations thereof.

Figure 1:
FIG. 1 illustrates of a simple rail corridor.
Figure 2:
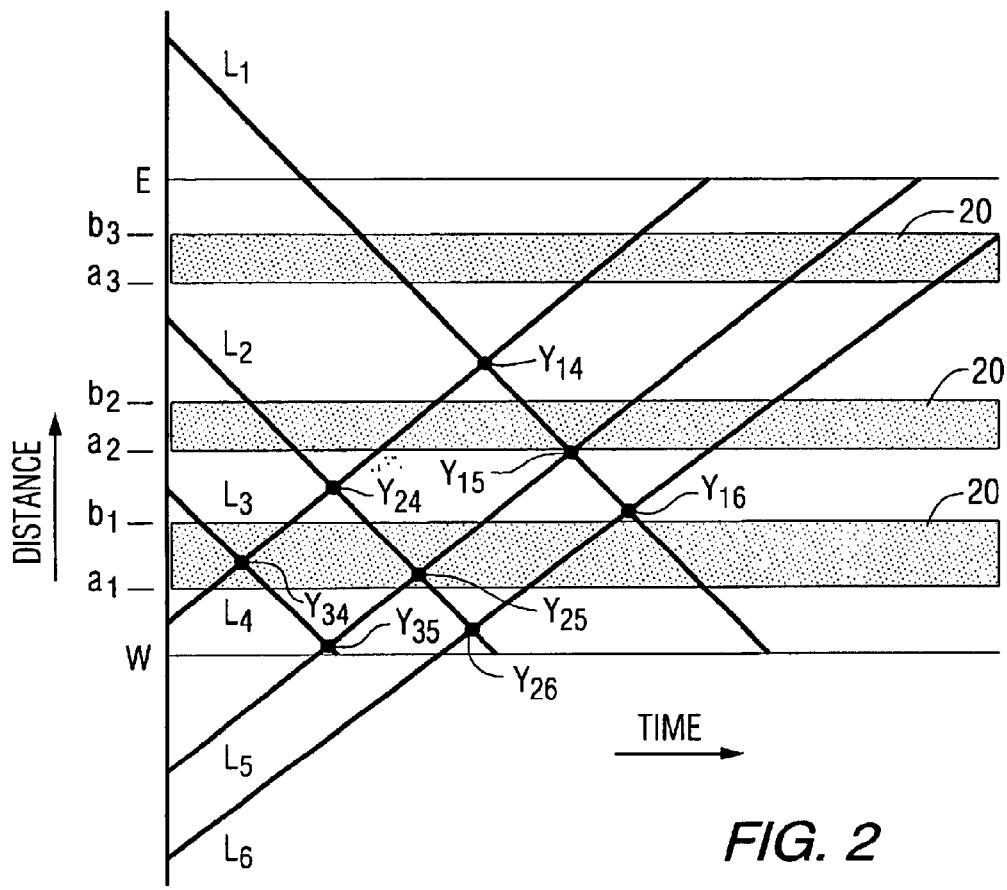
FIG. 2 is a string diagram illustrating the corridor scheduling problem in terms of intersecting lines.

The traditional method of graphic depiction of a train schedule for a rail corridor is referred to as a string graph as shown in FIG. 2. This string graph represents a time-distance graph of train movement in the corridor depicted in FIG. 1. The horizontal axis represents time, (i.e., a fixed window of time) and the vertical axis represents distance, with the point at the origin of the graph being the western end of the corridor, and the point at the top being the eastern end of the corridor. The width of the graph represents the period of interest in which the trains will be scheduled. Lines on the graph sloping one way represent traffic in one direction across the corridor, while lines slopping in the opposite direction represent oppositely-directed traffic. Only the position of the engine is shown. The horizontal bars across the graph, bearing reference to character 20, correspond to the siding locations.

The invention as presented herein is described in conjunction with a single-rail corridor with sidings. But those skilled in the art will recognize that it can be easily extended to multiple track main lines with cross-over switches between the main lines.

The essential criterion for an acceptable schedule, as expressed in terms of the string graph of FIG. 2, is that any two train trajectories (lines) on the graph must intersect at a siding 20. If their meets are at sidings, then in addition, a choice has to be made as to which train to side.

Note that, unless all of the intersecting lines actually intersect within the sidings 20, the schedule is infeasible. Assuming, for the nonce, that all train speeds will be fixed, the departure times for the trains can be adjusted in order to move the train lines about and attempt to place all intersection points over the sidings 20. In another embodiment of the present invention, it would be possible, as well, to vary train speeds, which would change the slopes of the train trajectory lines, in order to place intersection points over the sidings 20. In yet another embodiment, both speeds and departure times can be varied simultaneously to find a feasible meet/pass plan for the trains.

The process to be described herein treats the corridor scheduling problem as a geometry problem, rather than directly as a scheduling problem, as suggested by the prior art. It does so by providing a mechanism by which train trajectory lines are moved under control of a gradient-search process based on a differentiable cost function in a manner that moves the intersection points to or close to established sidings.

The search process of the present invention permits variation of speeds and departure times, separately or jointly, and will use an everywhere differentiable cost function that takes on lower values as the schedule approaches feasibility. Because the cost function is everywhere differentiable, an iterative, gradient-search method can be applied that assures that the successive schedules found by the search process in fact converge to a conflict-free result.

Moreover, it is possible to include, in another embodiment of the present invention, the constraint that a siding must be longer than a train to be sided on it. It is further possible to include, in yet another embodiment, the economic costs incurred by adjusting train schedules. In other embodiments, constraints on maximum train speed and the early departure of trains can also be considered.

It will be appreciated by those skilled in the art that although FIG. 2 illustrates a situation with three sidings and three trains traveling in each direction, the technique of the present invention can be easily extended to any number of trains operating in each direction and any number of sidings on the rail corridor. The concepts of the present invention can also be extended to a rail corridor with more than one main line and crossover switches between the main line tracks. The present invention can be applied to any rail corridor where one train can be switched to another track when a meet or pass with another train occurs.

The scheduling of trains must first be feasible, but in addition, there may be choices as to which trains to side or the order to run trains, which helps to assure that economic penalties will not be incurred or, failing that, will at least be ameliorated.

Figure 3:
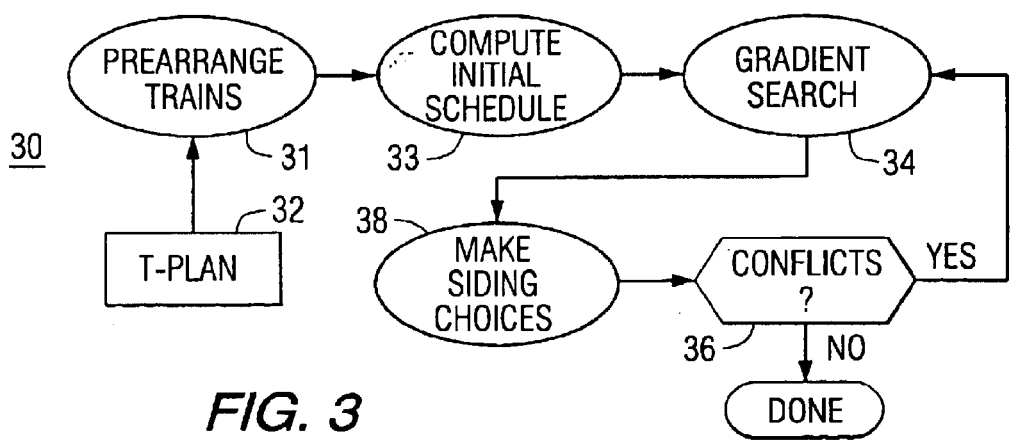
FIG. 3 is a flow chart for the corridor scheduling process of the present invention.

Process 30 for obtaining both schedule feasibility and economic acceptability may consist of a number of steps as shown in FIG. 3. First, at step 31, an initial prearrangement of the trains is done, establishing their order of entry into the corridor. At this point, the train order is based solely on due times, (represented as an input to step 31 from block 32) with no analysis as to the corridor capacity or specific departure times. At step 33, an initial schedule for the trains is determined; there are several numerical optimization techniques that may be applied here. See for example, Numerical Optimization by Jorge Nacedad and Stephen J. Wright; Springer, N.Y. 1999; ISBN 0-387-98793-2.

This initial schedule is input to the gradient search process, step 34, to be discussed below, which minimizes schedule infeasibility. In another embodiment the gradient search process can also minimize economic penalties incurred by the railroad for the late arrival of trains and give due consideration to maximum train speeds, early departure times and siding lengths. The gradient search adjusts train departure times (i.e., the time the train enters the corridor) and/or speeds so that meets occur near sidings. The process 30 loops through siding choice step 38 and the conflicts decision step 36 until all train intersections are placed at or near sidings on the rail corridor by adjusting the speed and/or departure time (i.e., the time the train enters the corridor) of the trains traversing the corridor.

The decisions made at step 38 as to which train to side for each pair of trains meeting at a siding may be driven by considerations of relative economic cost due to the delays created by siding one train versus another train. This siding decision process represents another embodiment of the present invention and will be discussed further below.

Once the siding decisions are made, some of the trajectories (those for sided trains) on the string graph (FIG. 2) will become broken lines, (representing infeasible meets) which may cause new schedule infeasibilities for some train trajectories. At this point, the gradient search can again be applied, but only to the subset of subtrajectories that have been driven into infeasible meets. Multiple passes through the gradient search step 34 and siding decision process step 38 should bring the schedule to complete feasibility.

Figure 4:
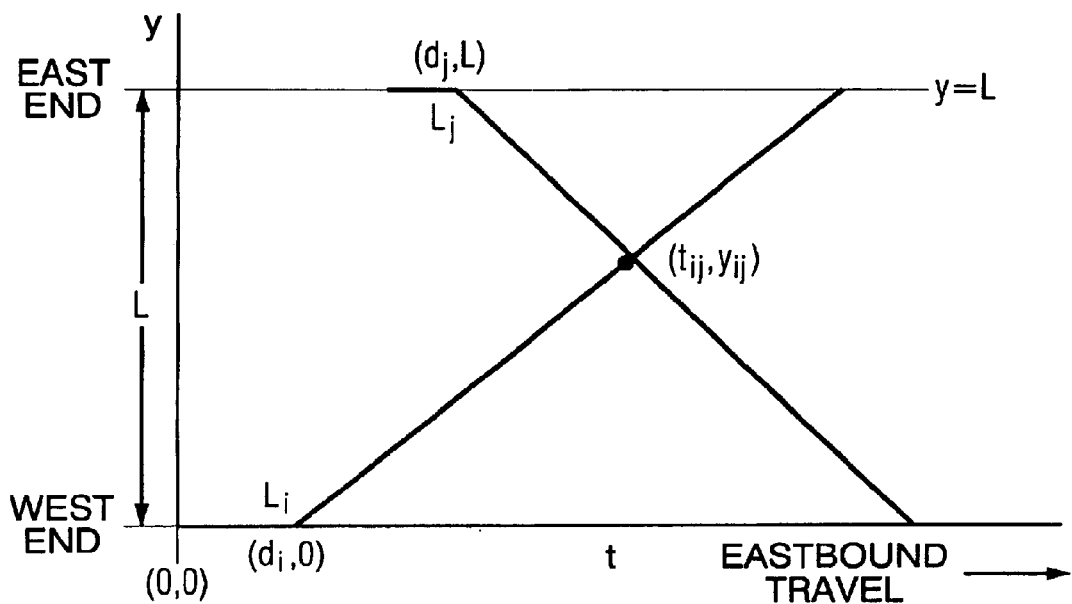
FIG. 4 illustrates the basic geometry of train trajectories.

FIG. 4 characterizes the train trajectories as lines based on the initial departure times (moment of entry into the corridor) and the train speed. In FIG. 4, the bottom of the vertical axis represents the west end of the corridor, and the positive direction along that axis corresponds to eastbound travel. The time window of interest for travel in the corridor begins at time $d_0$, and the length of the corridor is denoted by L.

FIG. 4 focuses on characterizing one eastbound train and one westbound train, respectively $T_i$ and $T_j$, with corresponding trajectories labeled $L_i$ and $L_j$. $s_i$, $s_j$ denote the speeds and $d_i$, $d_j$ denote the departure times of the trains $T_i$ and $T_j$ respectively. The departure time of a train is the time at which it enters the corridor: for an eastbound train, that corresponds to a point situated on the horizontal axis of FIG. 4, (i.e., t=0) and for a westbound train, that corresponds to a point located on the horizontal line y=L.

Then for train trajectory $L_i$ (eastbound), we may express the relationship between coordinates for any point on the line in the form $$\frac{y-0}{t-d_i} = s_i,$$

or $$y = s_i t - s_i d_i \qquad (3\text{-}1)$$

For train $T_j$ (westbound), the form of trajectory $L_j$ can be likewise expressed as $$\frac{y-L}{t-d_j} = -s_j,$$

or $$y = -s_j t + s_j d_j + L \qquad (3\text{-}2).$$

We can write equations of identical form for both eastbound and westbound trains by writing $$y = s_i t - s_i d_i + \theta_i L \qquad (3\text{-}3),$$

where the speed of westbound trains by convention will be the negative of the train's actual speed, and $$\theta_i = \begin{cases} 0 \text{ if train } T_i \text{ is eastbound} \\ 1 \text{ if train } T_i \text{ is westbound.} \end{cases} \qquad (3\text{-}4)$$

This form of a linear equation (3-3) is not the usual form directly in terms of slope and intercept, but in this analysis train speeds and departure times will be varied and the form of Equation 3-3 has the advantage of expressing the train trajectories explicitly in terms of speeds and departure times.

The objective of the present invention is to determine the coordinates of intersection points $(t_j, y_{ij})$ for pairs of train trajectories, and move these intersection points to sidings. For trains $T_i$ and $T_j$, the solution for the trajectory intersection point is $(t_{ij}, y_{ij})$, where $$t_{ij} = \frac{s_i d_i - s_j d_j + (\theta_j - \theta_i)L}{s_i - s_j}, \text{ and} \qquad (3\text{-}5)$$

-continued $$y_{ij} = \frac{s_i s_j (d_i - d_j) + (s_i \theta_j - s_j \theta_i) L}{s_i - s_j}. \quad (3\text{-}6)$$

$(t_{ij}, y_{ij})$ is derived by equating equation (3-1) and (3-2) (after making the notation change suggested by equation (3-3)).

This characterization of the intersection point applies to intersections of like-directed or oppositely-directed trains, so that the analysis to be developed concerning intersection points will adjust train trajectories involving both meets and passes.

To this point the train scheduling problem has been abstracted to a context of moving intersecting lines about until all intersection points are within certain ranges (the siding bars 20 in FIG. 2). When all intersection points that are within the rectangle (representing the corridor 8) are also within the sidings 20, we have obtained a feasible schedule.

It is an objective to obtain a feasible schedule using a search process that minimizes a cost function, and in the preferred embodiment, the preferred cost function will have a high value if any intersection point is outside a siding bar, and a low value if and only if all intersection points are within the siding bars. Intersection points entirely outside the graph are not considered; the corridor and scheduling period are considered to be co-extensive with the graph.

Figure 5:
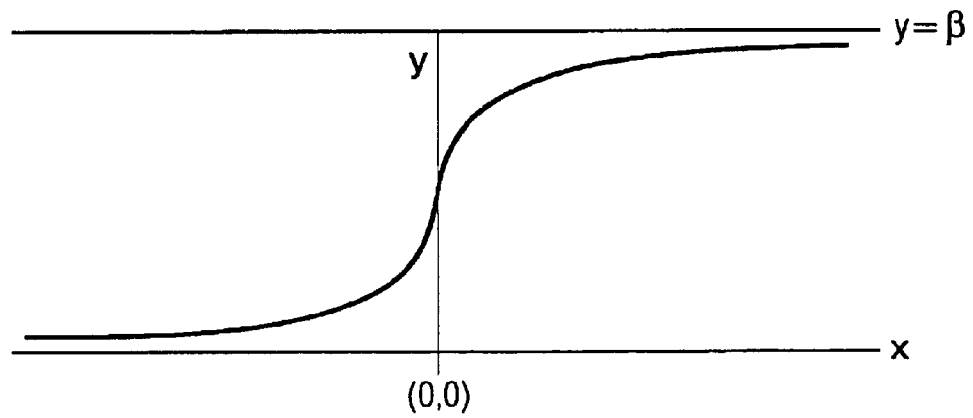
FIG. 5 is a graph of the basic sigmoid function.

Let a function of a single $y_{ij}$ with this cost function property be a localizer function, and construct such a localizer function using the sigmoid function as a basis. The preferred function will depend on the basic sigmoid function, which has the equation $$\sigma(x; \alpha, \beta) = \frac{\beta}{1 + e^{-\alpha x}}, \quad (4\text{-}1)$$

and has a graph of the form shown in FIG. 5.

The parameter $\beta$ of the sigmoid function determines a horizontal asymptote for the curve, and the parameter $\beta$ determines how sharply the function rises as it crosses the y-axis. As $\alpha$ approaches infinity, the sigmoid curve approaches a step function. In the preferred embodiment $\beta = 1.0$ and $\alpha = 0.5$.

Because the sigmoid function can transition sharply from a low to a high value, it is a good continuous approximation of discrete processes. Sums of sigmoids can also be used to determine whether or not a variable has a value in an interval. Specifically, for the interval [a, b], define the function $$D(x; a, b) = \sigma(x - a; \alpha, \beta) - \sigma(x - b; \alpha, \beta) \quad (4\text{-}2).$$

Figure 6:
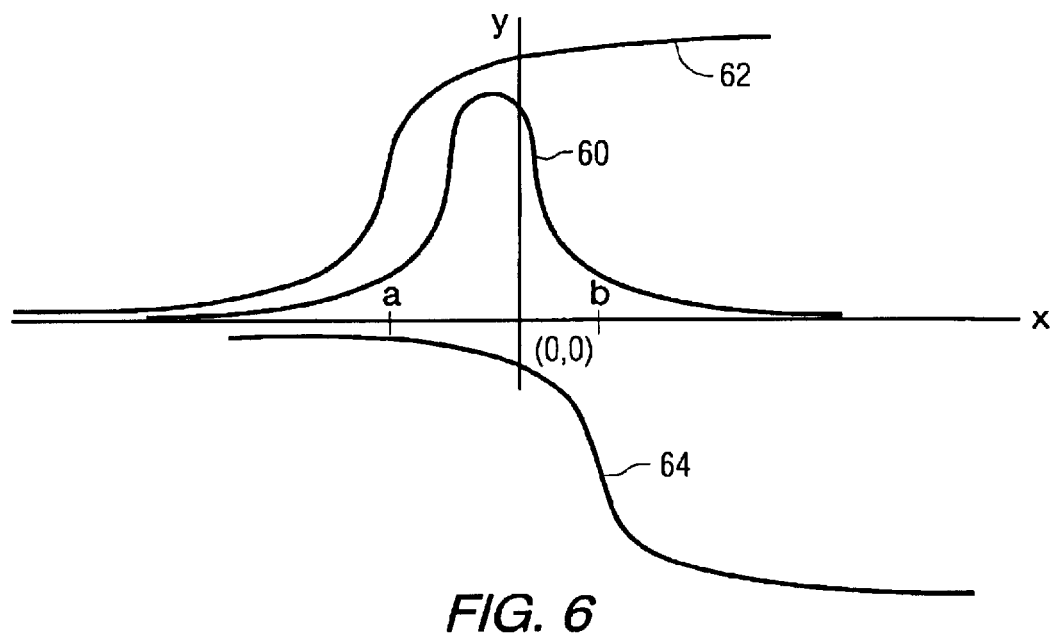
FIG. 6 illustrates the use of sigmoid sums to discriminate an interval.

Based on the graph of the sigmoid as depicted in FIG. 5, the graph of D(x; a, b) takes the form shown in FIG. 6, which shows the function D(x; a, b) (reference character 60) derived as a sum of two sigmoid functions 62 and 64.

Since each of the sigmoids 62 and 64 could be made to approximate a step function as closely as desired, the function D(x; a, b) can be defined to very sharply discriminate when x is in the interval [a, b], and can be made to approach a pulse of width b−a as closely as desired.

Also, since the function D(x; a, b) (reference character 60) approaches zero as x becomes more distant from the interval [a, b], it is possible to sum such interval discriminators (for non-overlapping intervals) and thereby obtain a function which takes a high value when x is in any of the intervals of interest, but is low otherwise. This is shown in FIG. 7 for the two intervals $[a_1, b_1]$ and $[a_2, b_2]$, and it is obvious to those skilled in the art that the construction is generalizable to any finite number of intervals.

Figure 7:
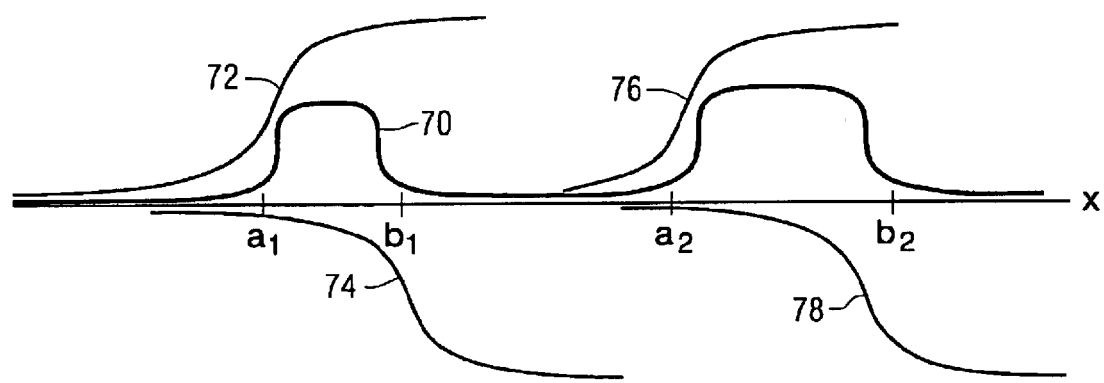
FIG. 7 illustrates the construction of a localizer function from sigmoid functions.

The localizer function 70 shown in FIG. 7 (generated by summing sigmoid functions 72, 74, 76, and 78) can be extended to any finite number of intervals, so such a localizer can be constructed for any corridor of the type in FIG. 1 (one main track, one or more sidings). The sidings are represented along the x-axis between points ai and bi.

The localizer function 70 has the form $$L'(x; \alpha, \beta, a_1, b_1, a_2, b_2) = \beta - \sum_{i=1}^{2} \sigma(x - a_i; \alpha, \beta) + \sum_{i=1}^{2} \sigma(x - b_i; \alpha, \beta)$$

Figure 8:
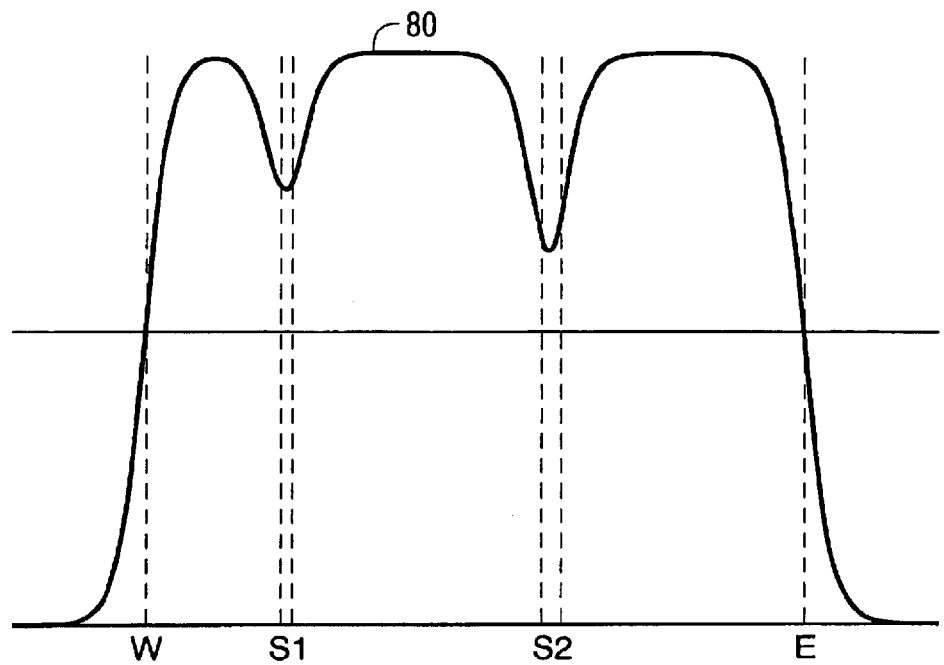
FIG. 8 illustrates an example of a localizer function for two sidings.

The cost function for the scheduling problem of FIG. 2 will be derived below using the localizer function concept, and assuming $n_S$ sidings. In the preferred embodiment, the cost function will be low if and only if the y-coordinate $y_{ij}$ for an intersection of train trajectories lies within the range of a siding, but the localizer function 70 of FIG. 7 in fact displays the opposite effect. Thus we will first define the localizer function $$L'(x; \alpha, \beta, a_1, b_1, \ldots, a_{n_S} b_{n_S}) = \quad (4\text{-}3)$$
$$\beta - \sum_{i=1}^{n_S} \sigma(x - a_i; \alpha, \beta) + \sum_{i=1}^{n_S} \sigma(x - b_i; \alpha, \beta),$$

which has the desired property of taking a low value if and only if x is in one of the intervals $$[a_1, b_1], \ldots, [a_{n_S} b_{n_S}],$$

and a high value otherwise. That is, Equation 4-3 defines a localizer function that is the inverse of the localizer function 70. See the localizer function 80 in FIG. 8.

The localizer function as defined above in Equation 4-3 (and taking the form of the inverse of the localizer function 70 in FIG. 7) will now be used to define a cost function which takes lower values as the intersection points of train trajectories are moved toward sidings. Two versions of the cost function are described separately below.

A Simplified Feasible-Schedule Cost Function

Now letting $n_T$ be the set of all trains to be run in the corridor, and letting $L_i$ represent the train trajectory line for train $T_i$ (as in FIG. 2). Define a set I of all possible y-coordinates of the intersection points between the train trajectories by $$I = \{y_{ij} / \{y_{ij}\} = L_i \cap L_j \& i, j \in \{1, \ldots, n_T\}\} \quad (5\text{-}1).$$

Note that, with reference to FIG. 2, this set includes all possible intersection points between train trajectories, even though some of those points may not be within the corridor 8 and/or time window of interest. It is necessary to consider such out-of-corridor intersection points because the search process will move the train trajectories, and may bring into the corridor 8 an intersection point that initially was outside the corridor 8.

To create a cost function that takes on a low value if and only if all intersection points lie within one of the sidings 20, we sum localizer function values derived from Equation 4-3. Specifically define the vector that represents all intersection points in the vicinity of $$\vec{y} = (y_{ij} / y_{ij} \in I) \quad (5\text{-}2),$$

and define the cost function $C'(\vec{y})$ by $$C'(\vec{y}) = \sum_{y_{ij} \in I} L'(y_{ij}; \alpha, \beta, a_1, b_1, \ldots, a_{n_s}, b_{n_s}). \quad (5\text{-}3)$$

The cost function is a multidimensional function of the vector y, where each value of the vector yields a different sum based on localizer function values. Each localizer function value comprising the sum indicates whether an intersection point is in a feasible range (the siding bars 20 of FIG. 2) or not. See the cost function 80 of FIG. 8, where the x-axis represents distance along the corridor. If all of the intersection points relative to a specific siding are feasible, $C'(\vec{y})$ should take a low value in the vicinity of points represented by that siding; otherwise, it takes a value near the value of β. When many intersection points are involved, β may have to be chosen so that the near-zero sums of a large number of feasible intersection points do not result in a value in the range of β, which would mask the feasibility that is to be discriminated by the function.

$C'(\vec{y})$ is a differentiable function of the vector $\vec{y}$ (the intersection points) and therefore in each of the variables that determine the various intersection points, i.e., departure times and/or speeds of the trains. Therefore the cost function can be used with gradient search technique or other search techniques based on partial derivatives, to minimize the cost function value at sidings. One such technique will be discussed below. Since each intersection point occurring as a component of $\vec{y}$ is a function of the train departure times and the speeds of the corresponding trains, we may treat the cost function as one which may be optimized by adjusting either speeds or origination times of the trains, or both.

Accounting for Corridor Endpoints

The fact that the intersection points in I may not always represent intersections of trajectories within the corridor 8 poses a difficulty for the cost function as defined in Equation 5-3, which is that any intersection point outside the corridor is a "don't care" point for the search process (so long as it remains outside the corridor), but the cost function as defined in Equation 5-3 will assign a high value to such a point. Recall that the cost function of Equation 5-3 is based on the localizer function of Equation 4-3, which is illustrated by reference character 90 in FIG. 9A. Thus as Equation 5-3 is currently formulated, an otherwise feasible solution might be masked by such a "don't care" point.

Figure 9A:
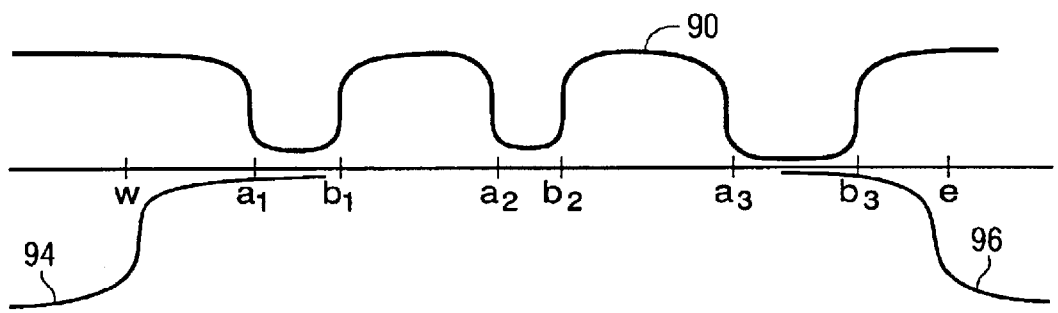
FIGS. 9A and 9B show the modification of a localizer function to account for corridor endpoints.
Figure 9B:
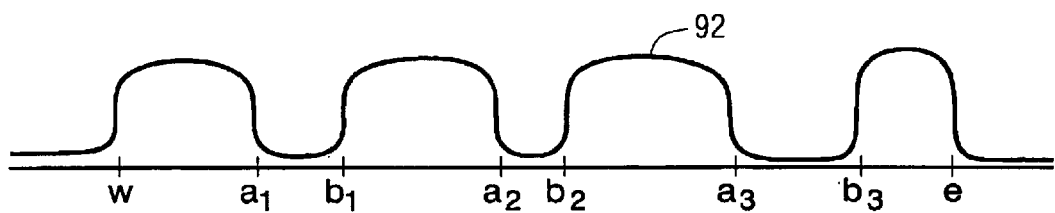

In another embodiment of the present invention, the solution involves modifying the localizer function 90. FIG. 9A depicts the localizer function 90, as defined by Equation 4-3, and a modified localizer function 92, which is generated by adding two more sigmoid functions 94 and 96 to account for the end points of the corridor 8.

Specifically, define e y-coordinate of the eastern end of the corridor 8, w=y-coordinate of the western end of the corridor 8, (5-4)

then alter the definition of the localizer function by including the sigmoid functions 74 and 96 as follows.

$$L(x;\alpha,a_1,b_1,\ldots,a_{n_s},b_{n_s},e,w) = L'(x;\alpha,\beta,a_1,b_1,\ldots a_{n_s},b_{n_s}) - \sigma(w-x;\alpha,\beta) - \sigma(x-e;\alpha,\beta) \quad (5\text{-}5).$$

The use of the localizer function L of Equation 5-5 also requires rewriting of the cost function in Equation 5-3, as follows.

$$C(\vec{y}) = \sum_{y_{ij} \in I} L(y_{ij}; \alpha, \beta, a_1, b_1, \ldots, a_{n_s}, b_{n_s}, e, w). \quad (5\text{-}6)$$

This cost function then should take a high value so long as any train trajectory intersection point within the corridor is infeasible, but has a low value for all feasible intersection points, as well as intersection points that fall outside of the corridor.

Like $C'(\vec{y})$, $C(\vec{y})$ is a differentiable function in each component of the vector $(\vec{y})$. Any Gradient search techniques or the use of other information based on partial derivatives, can be used to minimize the value of $C(\vec{y})$ in the regions of the sidings.

A Balanced Feasible-Schedule Cost Function

As can be seen from the localizer functions 70, 90, or 92, the sidings (as represented by the x-axis values $a_1$ to $b_1$) are shown as being of different lengths. In fact, rail corridors typically have sidings of different lengths. The consequence of different length sidings, with respect to the cost function (see Equation (5-6)) is that the cost function minima corresponding to sidings do not have the same y value. See the cost function 80 of FIG. 8. For siding S1, the cost function y value is represented by reference character 82 and the y value for siding S2 is represented by reference character 84. Note that the minimum at reference character 82 has a larger value than the minimum at reference character 84. Because the sidings are different lengths, the sigmoid sum that is creating the minimum uses a narrower portion of the sigmoid function for narrower sidings and, therefore, the associated minimum does not drop down as far as for a wider siding. This effect may cause the cost function gradient optimization process to favor a long siding with a deeper minimum when it is located very close to a short siding with a shallow minimum. In the embodiment discussed below, the cost function will be adjusted to achieve equal minima for all sidings.

Figure 10:
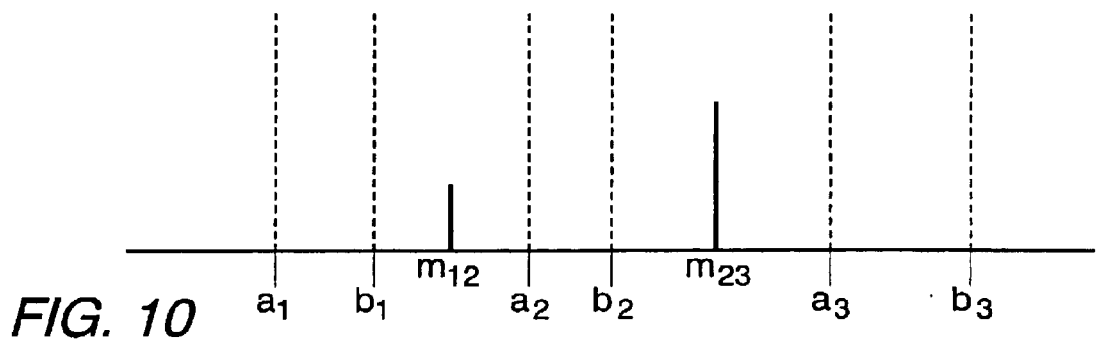
FIG. 10 illustrates the necessary geometry to achieve a balanced localizer function.

If the derivative of the localizer function 80 has a zero exactly at the midpoint between sidings, then the search process will have no tendency to favor one siding over another. We will call such a localizer function balanced. The situation depicted in FIG. 8 does not assure that the cost function derivative will have a zero properly situated; although the derivative may appear to be zero between the sidings, it can be shown by those skilled in the art, through equation manipulation, that the zero is usually off-center. FIG. 10 illustrates a means to achieve a close approximation to a balanced cost function. In FIG. 10, the intervals $[a_1, b_1]$, $[a_2, b_2]$, and $[a_3, b_3]$ represent locations of sidings along the main corridor. We would like to assure that the derivative of the localizer function, as defined for this corridor, will be zero at the midpoints $m_{12}$, and $m_{23}$ between sidings. The localizer function generating the cost function is a sum of sigmoids, each of which contributes substantially only within the immediate vicinity of the sidings for which it creates a minimum in the localizer function. If we assume that the localizer function at point $m_{12}$ does not depend significantly on the sigmoid terms other than those used to create minima for the two immediately surrounding sidings, then we may write a simplified localizer in the form $$\hat{L}(x;a_1,b_1,a_2,b_2) = \beta - \sigma(x-b_1;\alpha,\beta) + \sigma(x-a_1;\alpha,\beta) - \sigma(x-b_2;\alpha,\beta) + \sigma(x-a_2;\alpha,\beta) \quad (5\text{-}7).$$

Note here that the sigmoid functions used to generate the localizer function are only those sigmoid functions representing sidings to the left and right of the point of interest on the localizer function.

It can be shown by computation that $$\frac{\partial}{\partial x}(\tilde{L}(x; a_1, b_1, a_2, b_2))\bigg|_{x=m_{12}} = 0$$

provided that $$m_{12}-b_1=a_2-m_{12} \ \& \ m_2-a_1=b_2-m_{12},$$

as is shown in FIG. 10. This requirement will force both sidings to be of the same length, of course, and additionally, the next siding corresponding to the interval $[a_3, b_3]$ must then be the same length as the siding corresponding to interval $[a_2, b_2]$. It follows by induction that all sidings along the corridor must have equal lengths for the localizer function for the corridor to be balanced.

Bringing such an artifact to bear would have two effects:

(1) the search might, at least slightly, mislocate intersection points, since the exact position of the sidings would not be reflected in the model;

(2) siding lengths would not be accurately represented relative to train lengths.

Of these two drawbacks, the latter is in fact of no consequence, because the modification to the localizer function to account for siding lengths will not affect the subsequent step of the present invention (to be discussed below) wherein train lengths are considered relative to siding lengths. The former effect will be of minor consequence, since getting train intersection points nearly into the vicinity of sidings will allow minor adjustments to train speed to ensure intersections occur at sidings. This step of the present invention will also be discussed further below.

In another embodiment especially favorable if there is a large discrepancy between the shortest and longest siding, begin with all sidings assumed equal, thereby preventing bias among sidings in the early part of the search, and then adjust the localizer slowly back toward correct siding lengths as the search process iterates.

Specifically, this may be implemented in another embodiment of the present invention as follows. Before the search process begins, (1) compute the average siding length $S_{avg}$ as $$s_{avg} = \frac{\sum_{i=1}^{n_s}(b_i - a_i)}{n_s}; \quad (5\text{-}8)$$

(2) redefine the position of each siding $S_i$ (corresponding to corridor interval $[a_i, b_i]$) as corresponding to the interval $[a_i'(0), b_i'(0)]$, where $$a_i' = \frac{a_i + b_i - s_{avg}}{2}, \text{ and } b_i' = \frac{a_i + b_i + s_{avg}}{2}; \quad (5\text{-}9)$$

(3) define, for any integer n>0, $$a_i'(n)=a_i'e^{-\lambda n}+a_i(1-e^{-\lambda n}) \text{ and } b_i'(n)=b_i'e^{-\lambda n}+b_i(1-e^{-\lambda n}) \quad (5\text{-}10),$$

where $\lambda$ is a positive real number. Note then that $$a_i'(0) = a_i' \text{ and } \lim_{n \to \infty} a_i'(n) = a_i, \text{ and}$$

$$b_i'(0) = b_i' \text{ and } \lim_{n \to \infty} b_i'(n) = b_i.$$

Begin the process by letting n=0 and then as the search proceeds, increase n according to some scheme.

For example, one preferred scheme would be to note when successive values of the cost function (during the gradient search process as discussed below) have a difference smaller than a predetermined threshold (see for example, the threshold value $\epsilon$ referred to in conjunction with Equation 8-3 and the textual material following immediately thereafter), then begin to increase n (relative to the differences in siding lengths) and recompute the localizer function until siding lengths are within 5% of being accurate. This will permit the initial localizer to correspond to the balanced localizer, so that sidings will not tend to be favored solely by length. The initial "push" of intersections toward one or another siding will be unbalanced. As n increases, the localizer function will more accurately reflect the true corridor structure, so that eventually an accurate schedule is obtained.

Accounting for Train Lengths versus Siding Lengths

The cost function as described above permits a search for a feasible schedule only insofar that trains will meet in the vicinity of sidings. No reference has been made to the lengths of the trains relative to the sidings, and if two trains have a "feasible" meet at a siding that will hold neither of them, then the situation is not actually feasible. There are other reasons that trains may not use a siding, related to grade, transportation of hazardous materials, etc., so the following analysis to block the use of a siding by a given train refers to more situations than just train length versus siding length.

The cost function of Equation 5-6 will not prevent such an infeasibility from occurring, but in another embodiment, a simple modification of the localizer functions (Equation 5-5) on which the cost function is based will suffice to prevent such infeasibilities.

In particular, the cost function contains a term for each possible train trajectory intersection point. In the previous embodiment all such terms are of exactly the same form. Now suppose that we define the localizer functions to be specific to each possible intersection point of train trajectories, as follows. In this case, we generalize from the context of FIG. 2, and assume a total of $n_S$ sidings $S_1, \ldots, S_{n_S}$ along the corridor, and $n_T$ trains $T_1, \ldots, T_n$. We need the following notation:

let $$H_i = \text{the length of siding } S_i \ (i=1, \ldots, n_S) \quad (6\text{-}1),$$

and let $$M_i = \text{the length of train } T_i (i=1, \ldots, n_T) \quad (6\text{-}2).$$

For any two trains $T_i$ and $T_j$, define the following set of sidings from amongst all sidings in the corridor:

$$S_{ij} = \{S_k / k \in \{1, \ldots, N\} \& ((M_i \leq H_k) \vee (M_j \leq H_k))\} \quad (6\text{-}3).$$

$S_{ij}$ is the subset of sidings along the corridor on which at least one of the two trains $T_i$ and $T_j$ can be sided. Now, if the localizer function for the intersection point of the train trajectories of $T_i$ and $T_j$ does not include the sigmoid terms (see Equation 5-7) corresponding to sidings not in $S_{ij}$, then it will remain high even though $y_{ij}$ is within a siding, but the siding is too short for either train. In this way, accounting for siding versus train length actually reduces the computational complexity of the cost function.

To specifically redefine the cost function in this form, first redefine the localizer functions to be specific to train pairs, i.e., $$L_{ij}(y_{ij}; \alpha, \beta) = \beta - \sum_{h \in S_{ij}} \sigma(y_{ij} - a_h; \alpha, \beta) + \quad (6\text{-}4)$$

$$\sum_{h \in S_{ij}} \sigma(y_{ij} - b_h; \alpha, \beta) - \sigma(w - y_{ij}; \alpha, \beta) - \sigma(y_{ij} - e; \alpha, \beta).$$

Where the subscript "h" identifies a siding.
Finally redefine the cost function as $$C(\vec{y}) = \sum_{y_{ij} \in I} L_{ij}(y_{ij}; \alpha, \beta), \quad (6\text{-}6)$$

which extends the definition of feasibility so that now the value of $C(\vec{y})$ will be low if and only if
(1) all train trajectory intersections occur on siding bars, and
(2) at least one of the two trains in such an intersection can be sided in the corresponding siding.

Note that this technique can be extended beyond the consideration of train length versus siding length: if neither of two trains $T_i$ and $T_j$ can be sided on siding $S_k$ for any reason, then the localizer for the intersection point $Y_{ij}$ should omit the term corresponding to $S_k$. For example, we may have a case where a coal train could be sided at $S_k$, but would be unable to restart because of grade, but the interfering train, a multimodal, is absolutely not to be sided for a coal train. In this case, the siding may be long enough for either train, but would be precluded from consideration anyway. Clearly in other embodiments the definition of each $S_{ij}$ can be contracted to exclude cases such as this, thereby sharpening the ability of the search process to prevent unacceptable sidings.

Economic Costs, Early Departure, and Speed Constraints

The cost function as described by either Equation 5-6 or 6-6 will facilitate the finding of feasible train schedules, but includes no cognizance of the other effects of altering individual train schedules to achieve feasibility. In another embodiment, the cost function is modified so that it jointly considers schedule feasibility, and the economic cost of late arrival.

Economic Costs (i.e., Late Arrival) Function

Railroad freight service may incur various types of incentives for on-time delivery of freight. For the moment, consider just two types of delay penalties:
(1) step function penalty—if a train $T_i$ misses a preset delivery time $t_i$, there is a fixed penalty cost $h_i$;
(2) step function plus linear increase—if the preset delivery time $t_i$ is missed, there is an immediate penalty $h_i$ (possibly 0) which thereafter linearly increases at a rate of $m_i$ dollars per hour.

Figure 11A:
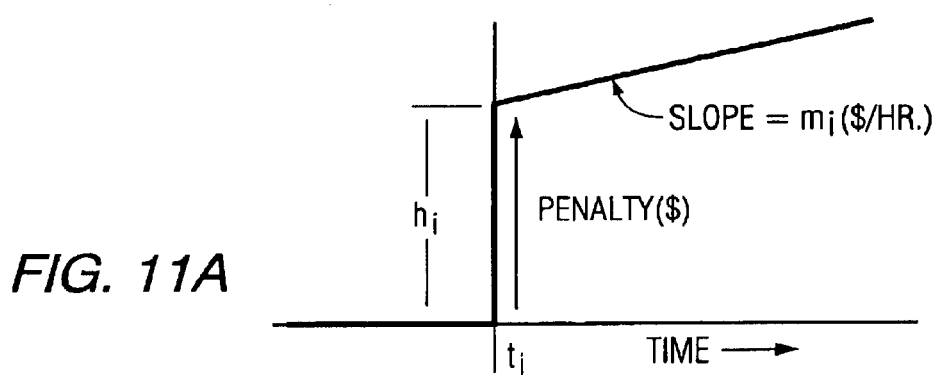
FIGS. 11A, 11B, and 11C illustrate a technique for approximating the economic penalty function.

FIG. 11A depicts a single generic form for both of these cases, since both $h_i$ and $m_i$ may be zero or positive. Thus, FIG. 11A illustrates a combined penalty function including both a step penalty plus a linear penalty.

Figure 11B:
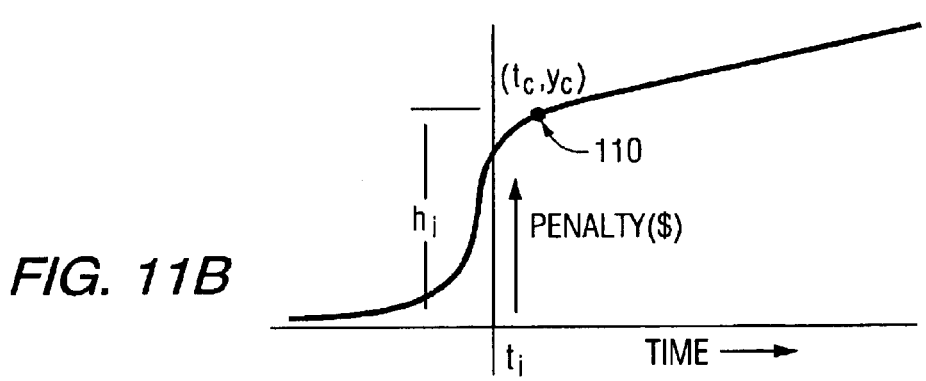
Figure 11C:
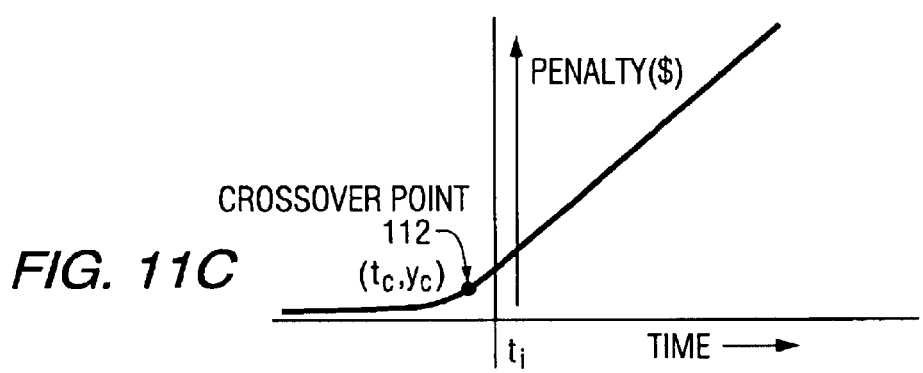

The cost function as proposed is in not a differentiable function since it lacks a defined slope at the time $t_i$. This fact precludes, or at least complicates, use of any gradient search technique for minimizing economic cost unless special allowances are made at or near the time $t_i$. For this reason, FIGS. 11B and 11C depict two approximations to the cost function, a step plus linear penalty, and a linear penalty only, respectively. In both figures, a line segment is grafted onto a sigmoid function in such a way that the resulting function remains differentiable at all points.

For the step plus linear penalty, a sigmoid is used to represent the cost up to a time slightly beyond $t_i$, to which is then appended a line of slope $m_i$. See FIG. 11B. Provided the crossover point from sigmoid to line segment is chosen at the point of the sigmoid where the slope is exactly $m_i$, (reference character 110) the resulting approximation is differentiable at all points, and therefore smoothly integratable into a gradient search process. If $(t_c, y_c)$ represents the crossover point; then the differentiable version of the penalty function may be defined by $$A_i(t; t_i, h_i, m_i) = \begin{cases} h_i \sigma(t - t_i; \alpha_i) & \text{for } t < t_c \\ m_i t + y_c - m_i t_i & \text{for } t \geq t_c \end{cases} \quad (7\text{-}1)$$

The sigmoids used here will all have $\beta_i$ values of 1, so that the notation for the parameter $\beta_1$ in each sigmoid will be suppressed. This choice is made so that the asymptote of the sigmoid is determined to be $h_i$, in conjunction with the penalty value to be represented.

The value of $\alpha_i$ is positive, and may be chosen to approximate the step cost as sharply as desired. In one embodiment the search is started with "gentle" sigmoids, then increase the values of the $\alpha_i$'s as the search progresses. This allows the early search to progress toward correct economic decisions rapidly, and then in the later stages of search, the information concerning economic cost is sharpened to provide more accurate final results.

In order to determine the crossover point 110 $((t_c, y_c)$ in FIG. 11B), it is necessary to solve the equation $$\frac{\partial}{\partial t}(h_i \sigma(t; \alpha_i))\bigg|_{t=t_c} = m_i \quad (7\text{-}2)$$

for the value of $t_c$, with $t_c > t_i$. The technique for solving this equation is well known to those skilled in the art. It should be mentioned that the slope of $\sigma(t-t_i; \alpha_i)$ is everywhere positive, and takes a maximum at the point $t=t_i$. That maximum can be driven as high as possible by selecting a large $\alpha_i$, so solving Equation 7-2 is always possible.

Finally, for the purposes of expressing the gradient as will be explained below, note that the independent variable t in Equation 7-1 is in fact a function of the departure time $d_i$ and speed $s_i$ of train $T_i$, and therefore we may rewrite the equation as $$A_i(s_i, d_i; t_i, h_i, m_i) = \begin{cases} h_i \sigma\left(d_i + \dfrac{L}{s_i} - t_i; \alpha_i\right) & \text{for } d_i + \dfrac{L}{s_i} < t_c \\ m_i d_i + \dfrac{L}{s_i} + y_c - m_i t_i & \text{for } d_i + \dfrac{L}{s_i} \geq t_c \end{cases} \quad (7\text{-}3)$$

FIG. 10C also uses a transition from sigmoid to line segment at point 112 on the sigmoid where the slope is exactly that of the line: the difference is that in this case the crossover point $t_c$ is less than $t_i$. Except for that fact, the approximating function has a description identical to that provided in Equations 7-1 and 7-3.

Now, we extend the cost function of Equation 5-6 or Equation 6-6 as follows. The extended cost function accounting for both schedule feasibility and economic cost is defined by $$F(\vec{y}) = \eta C(\vec{y}) + (1-\eta) \sum_{i=1}^{n_T} A_i(\vec{s}, \vec{d}; t_i, h_i, m_i), \qquad (7\text{-}4)$$

where $\eta \in [0,1]$ is a weighting factor between 0 and 1 used to adjust the relative importance between economic and schedule feasibility considerations.

$(\vec{d} = (d_1, d_2, \ldots d_{n_T})$ is the vector of train departure times, $\vec{s} = (s_1, s_2, \ldots, s_{n_T})$ is the vector of train speeds.

In fact, the intersection points y of train trajectories are functions of the train departure times and speeds, so we may rewrite Equation 7-4 in the form $$F(\vec{s}, \vec{d}) = \eta C(\vec{s}, \vec{d}) + (1-\eta) \sum_{i=1}^{n_T} A_i(s_i, d_i; t_i, h_i, m_i), \qquad (7\text{-}5)$$

and it is from this latter form that the gradient may be directly computed as discussed below.

The value of the weighting factor η must be chosen, and the choice is of some importance. Note that the cost function as defined in Equation 7-5 will be driven upward both by infeasible scheduling choices, as well as choices that make trains late, and vice versa. The difficulty arises when changes of departure times or speeds cause countervailing effects in the two halves of the cost function of Equation 7-5. If the first term, representing feasibility, is driven up by less than the second term, representing timeliness, is driven down, then the search process may be emphasizing economic cost to such an extent that it converges on infeasible schedules.

In one embodiment, the weighting actor η can be varied during the search. For example, starting with a low value of η would tend to try to force low economic cost at the expense of feasibility. This might cause the trains to swap places in the lineup, to improve the overall timeliness of arrivals, before the actual emphasis begins on selecting speeds and departure times that create a feasible schedule. In any event, the decision as to how to vary η during the search will benefit from actual testing with examples, and final mechanism for modulating η will necessarily come from experience familiar to those skilled in the art.

An approximate process for gauging the weighting factor η is to note that the cost components $C(\vec{s}, \vec{d})$ and $$\sum_{i=1}^{n_T} A(s_i, d_i; t_i, h_i, m_i)$$

comprise different numbers of summands, and therefore have different magnitudes approximately in proportion to the number of summands involved. For example, if there are a total of twenty trains, resulting in sixty intersections on the string graph, then $C(\vec{s}, \vec{d})$ comprises sixty summands and $$\sum_{i=1}^{n_T} A(s_i, d_i; t_i, h_i, m_i)$$

comprises twenty summands. To more or less equalize the effects of these two contributions to the cost function, one would set the weight η to the value η=20/(60+20)=0.25, thereby equalizing the contribution of each half of the cost function (i.e., the two terms $C(\vec{s}, \vec{d})$ and $$\sum_{i=1}^{n_T} A(s_i, d_i; t_i, h_i, m_i))$$

the total cost. From this example, it can be seen that the establishment of a specific value of η is very specific to the situation under study, as is generally recognized by those proficient in the art of complex optimization.

Early Departure Cost Function

The late penalty assessed for economic reasons will tend to prevent train departures from being arbitrarily late. However, the formulations of cost functions so far given (Equations 5-6, 6-6, 7-5) have no terms which prevent the train trajectories from being arbitrarily early. A cost function to prevent early departures can be formulated in terms of the ubiquitous sigmoid function by defining a cost $$E(\vec{d}) = \sum_{i=1}^{n_T} [1 - \sigma(d_i - e_i; \alpha'_i)], \qquad (7\text{-}6)$$

where $e_i$ is the earliest possible departure time for train $T_i$, and $\alpha_i'$ is denoted with a prime to distinguish it from the $\alpha_i$ of Equation 7-3.

Figure 12:
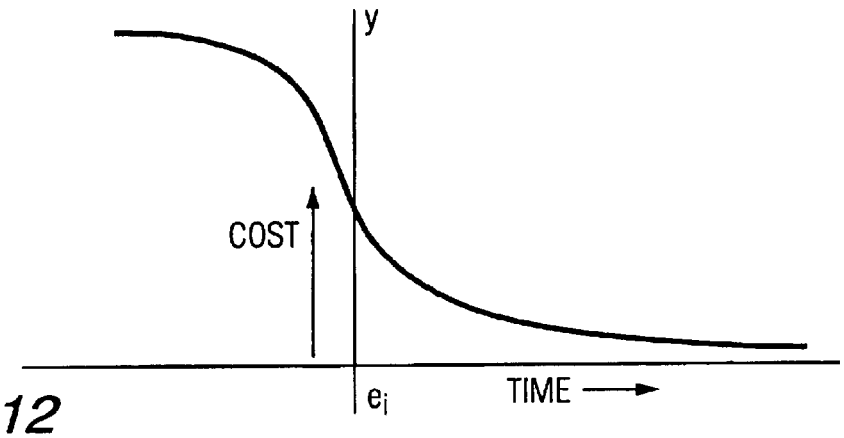
FIG. 12 shows a penalty term function for early departure of a train.

FIG. 12 represents a term of this cost function for train $T_i$; clearly, it rapidly becomes high as train $T_i$ is pushed toward an unrealizable departure time, and rapidly drops as the departure time enters the realizable region. There is no actual economic cost associated with early departures, just a feasibility issue. Therefore the terms of Equation 7-6 representing each train are arbitrarily given a height of 1, (i.e., sigmoid asymptotic value of 1) and this Equation 7-6 can likewise be combined with the cost functions for schedule feasibility and economic cost. Specifically, let $$G(\vec{s}, \vec{d}) = \eta_1 C(\vec{s}, \vec{d}) + \eta_2 A(\vec{s}, \vec{d}) + \eta_3 E(\vec{d}), \qquad (7\text{-}7)$$

where $$\eta_1 + \eta_2 + \eta_3 = 1 \qquad (7\text{-}8).$$

In one embodiment, the specific weighting of the components of cost in Equation 7-7 can be calculated as discussed above in the example with twenty trains and sixty intersections points in the corridor. The schedule feasibility and early departure terms will each have sixty summands and the economic penalty term will have twenty terms. Using an equation similar to the one set forth above for calculating η, we calculate $\eta_1 = 1/7$, $\eta_2 = 3/7$ and $\eta_3 = 3/7$. Other weighting values can be established based on specific user circumstances.

Maximum Train Speed Cost Function

In the embodiment when the search process is permitted to vary train speeds in order to achieve feasibility and cost minimization, there must be a means to prevent the speeds from exceeding practical limits for the trains and tracks involved. In this embodiment we will create an additional component of the cost function that will enforce such speed constraints. Such a speed constraint can be implemented analogously to the R early departure constraint of Equation 7-6. Specifically, define a speed cost function as $$V(\vec{s}) = \sum_{i=1}^{n_T} \sigma(s_i - s_i^{(\max)}), \quad (7\text{-}9)$$

where $s_i^{(\max)}$=the maximum allowable speed for train $T_i$.

Like the other cost functions discussed herein, since the maximum speed cost function is derived from a sum of sigmoid functions, it id a differentiable function with respect to the intersection points of the trains on the corridor. Therefore a gradient search process can be used to find the minima of the cost function values. The total cost function, including feasibility of meets and passes, constraints on early departures and late arrivals (i.e., economic penalty), as well as constraints on maximum train speed then is a generalization of Equation 7-7, namely $$G(\vec{s},\vec{d}) = \eta_1 C(\vec{s},\vec{d}) + \eta_2 A(\vec{s},\vec{d}) + \eta_3 E(\vec{d}) + \eta_4 V(\vec{s}) \quad (7\text{-}10),$$

where $$\eta_1 + \eta_2 + \eta_3 + \eta_4 = 1 \quad (7\text{-}11).$$

The specific values of the weighting factors for the components of Equation 7-10 can be determined by experiment. In one embodiment, using the same scheme as set forth above in conjunction with Equation (7-8), for twenty trains and sixty intersections, $\eta_1 = 0.1$ and $\eta_2 = \eta_3 = \eta_4 = 0.3$.

The Gradient Search Process

The gradient $\nabla f(\vec{x})$ of any function $f(\vec{x})$ is a vector in the same space as the independent variable $\vec{x}$ which points in direction of maximum change of $f(\vec{x})$ within a small local area on the function's surface, thereby pointing the way toward a local minimum or maximum. As such, it is much heralded in the legends and poetry of optimization theory. Calculation of the gradient of the various cost functions discussed below will permit location of the local minima identifying schedule feasibility.

In the current context of train scheduling, as will be appreciated by those skilled in the art, there are a number of possible parameters describing a train trajectory that may be varied to resolve conflicts within a rail corridor, i.e., to drive the cost function lower. The mathematics for a gradient search varying only the departure times or speeds of trains, and then varying both departure times and train speeds is discussed below. We will first deal only with the cost function associated with schedule feasibility (Equation 5-6) but will then extend the cost function to include considerations of economic costs, early departures and maximum train speed as discussed above, and represented by the cost function of Equation 7-10.

Gradient Search to Optimize Schedule Feasibility By Varying Only the Train Departure Times First, assume that there are $n_T$ trains and permit the vector $\vec{y}$ (as represented in Equation (5-2)) to contain all possible intersection points. But each intersection point $y_{ij}$ has the characterization given in Equation 3-6, which is repeated here for convenience.

$$y_{ij} = \frac{s_i s_j (d_i - d_j) + (s_i \theta_j - s_j \theta_i) L}{s_i - s_j}, \quad (8\text{-}1)$$

then $y_{ij}$ is directly expressed in terms of departure times and speeds for all of the trains in the schedule. Also for convenience, recall the notation for speeds and departure times originally introduced above, which are repeated below.

L=the length of the corridor, $s_i$=the speed of train $T_i$ (taken as a negative value for $T_i$ westbound), $d_i$=the departure time (time of entry into corridor) of train $t_i$, and $$\theta_i = \begin{cases} 0 \text{ for } T_i \text{eastbound} \\ 1 \text{ for } T_i \text{westbound} \end{cases}.$$

Next define the vectors $\vec{s} = (s_1, \ldots, s_{n_T})$ and $\vec{d} = (d_1, \ldots, d_{n_T})$. Express the cost function in the following terms. For notational convenience, suppress the dependence of the localizer and cost functions on $\alpha$ and $\beta$.

$$C(\vec{y}) = C(\vec{s},\vec{d}) = \sum_{y_{ij} \in I} L_{ij}(y_{ij}) = \sum_{y_{ij} \in I} L_{ij}(s_i, s_j, d_i, d_j). \quad (8\text{-}2)$$

The objective is to vary the vector $\vec{d}$ (train departure times) in order to drive the cost function lower, and one technique which can at least locate a local minimum of the cost function is the gradient-directed descent, defined iteratively as follows.

(1) Start with an initial estimate for departure time, $\vec{d}_0$ for each train $n_T$, a stopping criterion, $\epsilon > 0$, and a step size h.

(2) For the estimate, $\vec{d}_n$, compute the gradient $\nabla^{(\vec{d})} C(\vec{d})|_{\vec{d}=\vec{d}_n}$ of the cost function at $\vec{d}_n$, for varying only $\vec{d}$, and normalize it so that it has an absolute value of 1, i.e., define $$\vec{g} = \frac{\nabla^{(\vec{d})} C(\vec{d})\big|_{\vec{d}=\vec{d}_n}}{\left|\nabla^{(\vec{d})} C(\vec{d})\big|_{\vec{d}=\vec{d}_n}\right|}. \quad (8\text{-}3)$$

In the notation, the dependence of the cost function on $\vec{s}$ is suppressed, since for the nonce we are varying only $\vec{d}$.

(3) Compute the value $C_n = C(\vec{d}_n)$, compute $\vec{d}_{n+1} = \vec{d}_n - h\vec{g}$, and then compute $C_{n+1} = C(\vec{d}_{n+1})$.

(4) If $|C_n - C_{n+1}| < \epsilon$, then the search is stopped, and $\vec{d}_{n+1}$ is accepted as the final answer. Otherwise, replace $\vec{d}_n$ with $\vec{d}_{n+1}$ and return to Step (2). In the preferred embodiment, the search is stopped when $|C_n - C_{n+1}| \leq (0.001)|C_0 - C_1|$. The stopping threshold for such problems is very situation dependent, as is generally recognized by practitioners of the art of optimization.

It remains to explicitly represent the gradient $\nabla^{(\vec{d})} C(\vec{d})|_{\vec{d}=\vec{d}_n}$ which is used in the iteration. The cost function as shown in Equation 5-6 is a function of the vector of intersection points, $\vec{y}$, and the components of $\vec{y}$ are functions of the components of the vectors $\vec{s}$ and $\vec{d}$. Since at this point only d is variable, the gradient $\nabla^{(\vec{d})} C(\vec{d})$ of the cost function, is a vector of the form $$\nabla^{(\vec{d})} C(\vec{d}) = \left( \frac{\partial}{\partial d_1} C(\vec{d}), \frac{\partial}{\partial d_2} C(\vec{d}), \ldots, \frac{\partial}{\partial d_{n_T}} C(\vec{d}) \right), \quad (8\text{-}4)$$

and we may obtain each component of $\nabla^{(\vec{d})} C(\vec{d})$ by applying the chain rule for differentiation:

$$\frac{\partial}{\partial d_k} C(\vec{d}) = \frac{\partial}{\partial d_k} \left( \sum_{y_{ij} \in I} L_{ij}(y_{ij}) \right) = \frac{\partial}{\partial d_k} \left( \sum_{\substack{y_{ij} \in I \\ i=k \vee j=k}} L_{ij}(y_{ij}) \right) \quad (8\text{-}5)$$

$$= \sum_{y_{ik} \in I} \left[ \frac{\partial}{\partial y_{ik}} (L_{ik}(y_{ik})) \frac{\partial}{\partial d_k} (y_{ik}) \right]$$

$$= \sum_{y_{ik} \in I} \frac{\partial}{\partial y_{ik}} (L_{ik}(y_{ik})) \frac{\partial}{\partial d_k} \left( \frac{s_i s_k (d_i - d_k) + (s_i \theta_k - s_k \theta_i) L}{s_i - s_k} \right)$$

$$= \sum_{y_{ik} \in I} \frac{\partial}{\partial y_{ik}} (L_{ik}(y_{ik})) \left( \frac{-s_i s_k}{s_i - s_k} \right). \quad (8\text{-}6)$$

Using Equation 8-6 and Lemma A3 in the Appendix A we can finally express the k-th component of the gradient as $$\frac{\partial}{\partial d_k} (C(\vec{d})) = \quad (8\text{-}7)$$

$$\frac{\alpha}{\beta} \sum_{y_{ik} \in I} \left\{ \sum_{j=1}^{n_s} [\sigma(y_{ik} - b_j)(\beta - \sigma(y_{ik} - b_j)) - \sigma(y_{ik} - a_j)(\beta - \sigma(y_{ik} - a_j)) + \sigma(w - y_{ik})(\beta - \sigma(w - y_{ik})) - \sigma(y_{ik} - e)(\beta - \sigma(y_{ik} - e))] \left( \frac{s_i s_k}{s_i - s_k} \right) \right\}.$$

Gradient Search to Optimize Schedule Feasibility by Varying Only the Train Speeds Much of what was developed above can be applied here as well. The primary difference is that we now emphasize that $C(\vec{y})$ may be regarded as a function of the vector $\vec{s}$, with $\vec{d}$ held constant, and we wish to vary $\vec{s}$ to seek a local minimum of the cost function, and suppress the dependence on $\vec{d}$. We may therefore represent $C(\vec{y})$ as $$C(\vec{y}) = C(\vec{s}) \quad (8\text{-}8).$$

Starting with $$\nabla^{(\vec{s})} C(\vec{s}) = \left( \frac{\partial}{\partial s_1} C(\vec{s}), \frac{\partial}{\partial s_2} C(\vec{s}), \ldots, \frac{\partial}{\partial s_{n_T}} C(\vec{s}) \right), \quad (8\text{-}9)$$

we need to compute the components of the form $$\frac{\partial}{\partial s_k} (C(\vec{s}))$$

$(C(\vec{s}))$ using the differentiation chain rule. To that end, note that $$\frac{\partial}{\partial s_k} (C(\vec{s})) = \frac{\partial}{\partial s_k} \left( \sum_{y_{ij} \in I} L_{ij}(y_{ij}) \right) = \quad (8\text{-}10)$$

$$\frac{\partial}{\partial s_k} \left( \sum_{y_{ik} \in I} L_{ik}(y_{ik}) \right) = \sum_{y_{ik} \in I} \frac{\partial}{\partial y_{ik}} (L_{ik}(y_{ik})) \frac{\partial}{\partial s_k} (y_{ik}),$$

and we proceed to obtain an explicit expression for $$\frac{\partial}{\partial s_k} (y_{ik}),$$

$(y_{ik})$, as follows.

$$\frac{\partial}{\partial s_k} (y_{ik}) = \frac{\partial}{\partial s_k} \left( \frac{s_i s_k (d_i - d_k) + (s_i \theta_k - s_k \theta_i) L}{s_i - s_k} \right) = \quad (8\text{-}11)$$

$$= \frac{[s_i s_k (d_i - d_k) + (s_i \theta_k - s_k \theta_i)](-1) + (s_i - s_k)[s_i (d_i - d_k) - \theta_i L]}{(s_i - s_k)^2}$$

$$= \frac{s_i (d_i - d_k)(s_i - 2s_k) + L(2s_k \theta_i - s_i \theta_k - s_i \theta_i)}{(s_i - s_k)^2}.$$

Exploiting Equations 8-10, 8-11, and Lemma A3 of the Appendix A provides a final explicit form for the gradient, as shown below $$\frac{\partial}{\partial s_k} (C(\vec{s})) = \quad (8\text{-}12)$$

$$\frac{\alpha}{\beta} \sum_{y_{ik} \in I} \left\{ \sum_{j=1}^{N} [\sigma(y_{ik} - b_j)(\beta - \sigma(y_{ik} - b_j)) - \sigma(y_{ik} - a_j) \right.$$

$$(\beta - \sigma(y_{ik} - a_j)) + \sigma(w - y_{ik})(\beta - \sigma(w - y_{ik})) -$$

$$\left. \sigma(y_{ik} - e)(\beta - \sigma(y_{ik} - e))] \frac{\partial}{\partial s_k} (y_{ik}) \right\}.$$

The search rule using the gradient as computed in Equation 8-12 is an exact analogue of the search rule given in Equation 8-7 with any occurrence of the vectors $\vec{d}, \vec{d}_0, \vec{d}_n, \vec{d}_{n+1} \ldots$ replaced with the vectors $\vec{s}, \vec{s}_0, \vec{s}_n, \vec{s}_{n+1} \ldots$, respectively.

Gradient Search to Optimize Schedule Feasibility by Varying both Departure Times and Train Speeds Bearing in mind that the speeds and departure times of trains can be varied independently, we may also exploit the expression of the cost function as a function of both $\vec{s}$ and $\vec{d}$, i.e., $$C(\vec{y}) = C(\vec{s}, \vec{d}),$$

and consider the joint variation of speed and departure time to seek a cost function local minimum. In this case, the gradient vector takes the form $$\nabla^{(\vec{s}, \vec{d})} C(\vec{s}, \vec{d}) = \quad (8\text{-}13)$$

$$\left(\frac{\partial}{\partial s_1}C(\vec{s},\vec{d}), \ldots, \frac{\partial}{\partial s_{n_T}}C(\vec{s},\vec{d}), \frac{\partial}{\partial d_1}C(\vec{s},\vec{d}), \ldots, \frac{\partial}{\partial d_{n_T}}C(\vec{s},\vec{d})\right).$$

Because $\vec{s}$ and $\vec{d}$ are not functionally dependent on each other, it follows that $$\frac{\partial}{\partial s_k}(C(\vec{s},\vec{d})) = \frac{\partial}{\partial s_k}(C(\vec{s},)) \text{ and } \frac{\partial}{\partial d_k}(C(\vec{s},\vec{d})) = \frac{\partial}{\partial d_k}(C(\vec{d})), \quad (8\text{-}14)$$

so the components of the gradient of Equation 8-13 are already determined by Equations 8-7, 8-11, and 8-12.

The search rule in this case is of the same form as Equation 8-7, except that we consider the aggregate vector $$\vec{v} = (\vec{s}, \vec{d}) \quad (8\text{-}15),$$

and replace all references to $\vec{d}, \vec{d}_0, \vec{d}_n, \vec{d}_{n+1}$ in that rule with references to $\vec{v}, \vec{v}_0, \vec{v}_n, \vec{v}_{n+1}$, respectively.

Including Early Departure Effects in the Gradient Search

Recall from the discussion above that a cost function causing high cost for early train departures, and low cost otherwise, can be posed in terms of the sigmoid function. Repeating Equation 7-6, $$E(\vec{d}) = \sum_{i=1}^{n_T} [1 - \sigma(d_i - e_i; \alpha'_i)], \quad (8\text{-}16)$$

where $e_i$ is the earliest possible departure time for train $T_i$, and $\alpha_i'$ affects the steepness of the rise of cost as early departure is approached.

The value of $\alpha'$ may be set by experiment, but the results should not be particularly sensitive to its value. A good first guess, in one embodiment, for the value of $\alpha_i'$ would be 0.8, although this parameter might be made smaller if there is some latitude as to the earliest departure times.

If we wish to combine this early departure cost with schedule feasibility cost, we do so in a weighted sum of terms, i.e., $$D(\vec{s}, \vec{d}) = \eta C(\vec{s}, \vec{d}) + (1-\eta)E(\vec{d}) \eta \in (0,1) \quad (8\text{-}17),$$

This concept was previously discussed above. See for example, Equation 7-7 where the aggregate cost function includes schedule feasibility, economic cost, and early departure effects.

Since the gradient operation is linear on the space of functions to which it applies, we may write $$\nabla(D(\vec{s},\vec{d})) = \eta \nabla(C(\vec{s},\vec{d})) + (1-\eta)\nabla(E(\vec{d})) \quad (8\text{-}18).$$

We will rely on the previous gradient computations for the first term on the right side of Equation 8-17. See Equation 8-7 with the substitutions set forth in Equation 8-15 and the text following.

To deal with the second term on the right side of Equation 8-17 or 8-18, assume only the departure time vector $\vec{d}$ will be varied in a search for a schedule which is both feasible and prevents early departures. We then wish to determine the gradient of $E(\vec{d})$ relative to the vector $\vec{d}$, which is of the form $$\nabla^{(\vec{d})}(E(\vec{d})) = \left(\frac{\partial}{\partial d_1}(E(\vec{d})), \frac{\partial}{\partial d_2}(E(\vec{d})), \ldots, \frac{\partial}{\partial d_{n_T}}(E(\vec{d}))\right), \quad (8\text{-}19)$$

and (see Equations 8-6 and A-2)

$$\frac{\partial}{\partial d_k}(E(\vec{d})) = (1-\eta)\left[\sum_{i=1}^{n_T} \frac{\partial}{\partial d_k}(1 - \sigma(d_i - e_i; \alpha'_i))\right] \quad (8\text{-}20)$$

$$= -(1-\eta)(1 - \sigma(d_k - e_k; \alpha'_k))\sigma(d_k - e_k; \alpha'_k)).$$

We can now construct the gradient $\nabla^{(\vec{d})}(D(\vec{s},\vec{d}))$ using Equations 8-7, 8-18, and 8-20. Departure times are independent of train speeds, so the cost component $E(\vec{d})$ does not depend on the speeds $\vec{s}$. Thus the final form of the gradient $$\nabla^{(\vec{s},\vec{d})}E(\vec{s},\vec{d}) = (E_1, \ldots, E_{n_T}, E_{n_T+1}, \ldots, E_{2n_T}) \quad (8\text{-}21)$$

with both train speeds and departure times variable, can be summarized as $$E_i = \begin{cases} \eta \frac{\partial}{\partial s_i}(C(\vec{s},\vec{d})) & \text{for } i \in \{1, \ldots, n_T\} \\ \eta \frac{\partial}{\partial d_i}(C(\vec{s},\vec{d})) - (1-\eta) & \text{for } i \in \{n_T+1, \ldots, 2n_T\} \\ (1 - \sigma(d_i - e_i; \alpha'_i))\sigma(d_i - e_i; \alpha'_i)) \end{cases} \quad (8\text{-}22)$$

where reference is implicitly made to Equations 8-7, 8–12, and 8-15.

Including the Economic Costs in the Gradient Search

The types of costs incurred by railroads for late deliveries were discussed above, and there was provided a differentiable approximation to the function of late costs expressed as a function of time. By using such an approximation, which is everywhere differentiable, the avoidance of late costs can be incorporated into the gradient search process. Arrival times are affected by both train speeds and train departure times, although either speed, departure time, or both may be varied during the search.

The form of the late cost approximation function was given by (see Equation 7-3)

$$A_i(u_i; t_i, h_i, m_i) = \begin{cases} h_i \sigma(u_i - t_i; \alpha_i) & \text{for } u_i < t_c \\ y_c + m_i(u_i - t_i) & \text{for } u_i \geq t_c, \end{cases} \quad (8\text{-}23)$$

where $u_i$=the actual arrival time of the train, $t_i$=the time at which late penalties begin to accrue, $h_i$=the size of the step penalty (in k$), $m_i$=the rate of the linear portion of the penalty (in k$/hr.), and $t_c$=the transition point where the cost function changes from a sigmoid to a line segment.

Shortening this cost function to the form $A_i(u_i)$ for the nonce, and defining $\vec{u} = (u_1, \ldots, u_{n_T})$, we may express a cost function which accounts for the arrival times of all trains in the form $$A(\vec{u}) = \sum_{i=1}^{n_T} A_i(u_i). \tag{8-24}$$

But we also have the relationship $$u_i = d_i + \frac{L}{s_i}, \tag{8-25}$$

so we may consider an alternative representation of Equation 8-24 as $$A(\vec{s}, \vec{d}) = \sum_{i=1}^{n_T} A_i(s_i, d_i). \tag{8-26}$$

This latter form of the cost is appropriate to our search process, since that process is based on varying the components of the vector $\vec{s}$ and $\vec{d}$.

Now to incorporate late arrival costs into the search, we extend the cost function of Equation 8-18 to the form $$D(\vec{s}, \vec{d}) = \eta_1 C(\vec{s}, \vec{d}) + \eta_2 E(\vec{d}) + \eta_3 A(\vec{s}, \vec{d}) \tag{8-27},$$

where the $\eta_i$ are weighting factors satisfying $$\eta_1 + \eta_2 + \eta_3 = 1 \tag{8-28}.$$

The choices for these weights must be determined by experiment, and in one embodiment of the present invention it is possible to vary them iteratively as the search progresses. Individual users of the present invention may assign these weights as determined by the characteristics of the corridor and the costs imposed to the railroad for the various effects built into the search algorithm. In the preferred embodiment, these weights take on values as determined in conjunction with the discussion of Equation (7-8) above.

Gradient Search to Optimize Schedule Feasibility, Early Departures, and Economic Costs by Varying Only the Train Departure Times A search using the late arrival cost function of equation 8-27 may involve variation of only the departure times $\vec{d}$, in which case the gradient by which the search is directed is of a form analogous to that shown in Equation 8-19. We may then express a component of the gradient vector in the form $$\frac{\partial}{\partial d_k}(D(\vec{s}, \vec{d})) = \eta_1 \frac{\partial}{\partial d_k}(C(\vec{s}, \vec{d})) + \eta_2 \frac{\partial}{\partial d_k} E(\vec{d}) + \eta_3 A(\vec{s}, \vec{d}). \tag{8-29}$$

Borrowing from Equations 8-6 and 8-20, we expand Equation 8-29 to the form $$\frac{\partial}{\partial d_k}(D(\vec{d}, \vec{s})) = \eta_1 \left[ \sum_{y_{ik} \in I} \frac{\partial}{\partial y_{ik}}(L_{ik}(y_{ik}))\left(\frac{-s_i s_k}{s_i - s_k}\right) \right] - \tag{8-30}$$

$$\eta_2(1 - \sigma(d_k - e_k; \alpha'_k)\sigma(d_k - e_k; \alpha'_k)) +$$

$$\eta_3 \frac{\partial}{\partial d_k}(A(\vec{s}, \vec{d}))$$

$$= \eta_1 \left[ \sum_{y_{ik} \in I} \frac{\partial}{\partial y_{ik}}(L_{ik}(y_{ik}))\left(\frac{-s_i s_k}{s_i - s_k}\right) \right] -$$

-continued $$\eta_2(1 - \sigma(d_k - e_k; \alpha'_k)\sigma(d_k - e_k; \alpha'_k)) +$$

$$\eta_3 \frac{\partial}{\partial u_k}(A_k(u_k))\frac{\partial}{\partial d_k}(u_k)$$

$$= \eta_1 \left[ \sum_{y_{ik} \in I} \frac{\partial}{\partial y_{ik}}(L_{ik}(y_{ik}))\left(\frac{-s_i s_k}{s_i - s_k}\right) \right] -$$

$$\eta_2(1 - \sigma(d_k - e_k; \alpha'_k)\sigma(d_k - e_k; \alpha'_k)) +$$

$$\begin{cases} \eta_3 h_k \alpha_k (1 - \sigma(u_k; \alpha_k))\sigma(u_k; \alpha_k) & \text{for } u_k \leq t_c \\ \eta_3 m_k & \text{for } u_k > t_c, \end{cases}$$

which, with the help of Equation 8-7, provides an explicit representation of the components of the gradient of $D(\vec{s}, \vec{d})$ when only the train departure times are varied.

Gradient Search to Optimize Schedule Feasibility, Early Departures, and Economic Costs by Varying Only the Train Speeds If the departure time of trains are held constant, and speeds are varied, then the gradient used to alter the speed vector $\vec{s} = (s_1, \ldots, s_{n_T})$ during the search is of the form $$\nabla^{(\vec{s})} D(\vec{s}, \vec{d}) = \nabla(\eta_1 C(\vec{s}, \vec{d}) + \eta_2 E(\vec{d}) + \eta_3 A(\vec{s}, \vec{d})) \tag{8-31}$$

$$= \eta_1 \nabla C(\vec{s}, \vec{d}) + \eta_3 \nabla A(\vec{s}, \vec{d}),$$

Where $E(\vec{d})$ is independent of the train speed. We therefore can obtain the k-th component of this gradient as $$\frac{\partial}{\partial s_k}(D(\vec{s}, \vec{d})) = \eta_1 \frac{\partial}{\partial s_k}(C(\vec{s}, \vec{d})) + \eta_3 \frac{\partial}{\partial s_k}(A(\vec{s}, \vec{d})) \tag{8-32}$$

$$= \eta_1 \frac{\partial}{\partial s_k}(C(\vec{s}, \vec{d})) + \eta_3 \left[\frac{\partial}{\partial u_k}(A(\vec{u}))\frac{\partial}{\partial s_k}(u_k)\right]$$

$$= \eta_1 \frac{\partial}{\partial s_k}(C(\vec{s}, \vec{d})) +$$

$$\eta_3 \cdot \begin{cases} \frac{-h_k \alpha_k L(1 - \sigma(u_k; \alpha_k))\sigma(u_k; \alpha_k)}{s_k^2} & (u_k \leq t_k) \\ \frac{-Lm_k}{s_k^2} & (u_k > t_k), \end{cases}$$

where the first term on the right side of Equation 8-32 can be expressed in a completely explicit form by reference back to Equation 8-12.

Gradient Search to Optimize Schedule Feasibility, Early Departures, and Economic Costs by Varying Both Train Departure Times and Train Speeds In this case, both $\vec{d}$ and $\vec{s}$ are variables in the complete cost function of Equation 8-25, so the gradient takes the form $$\nabla^{(\vec{s}, \vec{d})}(D(\vec{s}, \vec{d})) = \tag{8-33}$$

$$\eta_1 \nabla^{(\vec{s}, \vec{d})}(C(\vec{s}, \vec{d})) + \eta_2 \nabla^{(\vec{d})}(E(\vec{d})) + \eta_3 \nabla^{(\vec{s}, \vec{d})}(A(\vec{s}, \vec{d})).$$

Again regarding the gradient in vector form, the components of the first term of the sum on the left of Equation 8-33 are readily obtainable with the help of Equations 8-14, as explicitly represented with the help of Equations 8-7, 8–11, and 8-12. The components of the second term can be obtained using Equation 8-20, and the components of the third term are obtained using Equations 8-30 and 8-32.

Including Maximum Speed Limitation Effects in the Gradient Search

A component of the cost function that would rise sharply in value as the speed $s_i$ of a train $T_i$ became close to the maximum speed $s_i^{(max)}$ specified for the train was developed above. That component had the formulation (see Equation 7-9)

$$V(\vec{s}) = \sum_{i=1}^{n_T} \sigma(s_i - s_i^{(max)}), \quad (8\text{-}34)$$

and occurred as a weighted term of the cost function, i.e., $$G(\vec{s}, \vec{d}) = \eta_1 C(\vec{s}, \vec{d}) + \eta_2 A(\vec{s}, \vec{d}) + \eta_3 E(\vec{d}) + \eta_4 V(\vec{s}) \quad (8\text{-}35)$$

where the sum of the weights is chosen to be 1 in the preferred embodiment. Since variation of speed is independent of the departure times of trains, we have that $$\nabla^{(\vec{d})} V(\vec{s}) = 0, \quad (8\text{-}36)$$

so constraining the search by maximum train speeds does not effect the components of the gradient obtained as partial derivatives with respect to the departure times. Relative to the gradient terms obtained as partial derivatives with respect to train speeds, we have $$\nabla^{(\vec{s})} G(\vec{d}, \vec{s}) = \eta_1 \nabla^{(\vec{s})} C(\vec{d}, \vec{s}) + \eta_2 \nabla^{(\vec{s})} A(\vec{d}, \vec{s}) + \eta_4 \nabla^{(\vec{s})} V(\vec{s}) \quad (8\text{-}37)$$

$$= \eta_1 \nabla^{(\vec{s})} C(\vec{d}, \vec{s}) + \eta_2 \nabla^{(s)} A(\vec{d}, \vec{s}) +$$

$$\eta_4 \left( \frac{\partial}{\partial s_1}(V(\vec{s})), \ldots, \frac{\partial}{\partial s_{n_T}}(V(\vec{s})) \right), \text{ and}$$

$$\frac{\partial}{\partial s_k}(V(\vec{s})) = \frac{\partial}{\partial s_k}\left( \sum_{i=1}^{n_T} \sigma(s_i - s_i^{(max)}; \alpha, \beta) \right) \quad (8\text{-}38)$$

$$= \frac{\alpha}{\beta}(1 - \sigma(s_i - s_i^{(max)}; \alpha, \beta))\sigma(s_i - s_i^{(max)}; \alpha, \beta),$$

where the explicit form of the derivative in Equation 8-38 is from Equation A-2 of the Appendix.

Expression of the Full Gradient

For the sake of completeness, the complete expressions of these components of Equation 8-38 are provided below. First, let $$D_k = \begin{cases} \frac{\partial}{\partial s_k}(D(\vec{s}, \vec{d})) & \text{for } k \in \{1, \ldots, n_T\} \\ \frac{\partial}{\partial d_k}(D(\vec{s}, \vec{d})) & \text{for } k \in \{n_T + 1, \ldots, 2n_T\} \end{cases} \quad (8\text{-}39)$$

and select the weighting factors $\eta_1, \eta_2, \eta_3, \eta_4$ satisfying $$\eta_1 + \eta_2 + \eta_3 + \eta_4 = 1.$$

Note the indexing of the vector $\vec{D}$ places the partial derivatives with respect to $s_k$ first and then the partial derivatives with respect to $d_k$ second, but there are $n_T$ values of each index.

$$D_k = \eta_1 \frac{\alpha}{\beta} \sum_{y_{ik} \in I} \left\{ \sum_{j=1}^{N} [\sigma(y_{ik} - b_j)(\beta - \sigma(y_{ik} - b_j)) - \right. \quad (8\text{-}40)$$

$$\sigma(y_{ik} - a_j)(\beta - \sigma(y_{ik} - a_j)) +$$

$$\sigma(w - y_{ik})(\beta - \sigma(w - y_{ik})) -$$

$$\left. \sigma(y_{ik} - e)(\beta - \sigma(y_{ik} - e))] \frac{\partial}{\partial s_k}(y_{ik}) \right\} +$$

$$\eta_3 \cdot \left( \frac{-L}{s_k^2} \right) \begin{cases} h_k \alpha_k (1 - \sigma(u_k; \alpha_k))\sigma(u_k; \alpha_k) & (u_k \le t_k) \\ m_k & (u_k > t_k) \end{cases} +$$

$$\eta_4 \frac{\alpha}{\beta}(1 - \sigma(s_i - s_i^{(max)}; \alpha, \beta))\sigma(s_i - s_i^{(max)}; \alpha, \beta), \text{ where}$$

$$\frac{\partial}{\partial s_k}(y_{ik}) = \frac{s_i(d_i - d_k)(s_i - 2s_k) + L(2s_k\theta_i - s_i\theta_k - s_i\theta_i)}{(s_i - s_k)^2}. \quad (8\text{-}41)$$

For $k \in \{n_T + 1, \ldots, 2n_T\}$, $\quad (8\text{-}42)$ $$D_k = \eta_1 \frac{\alpha}{\beta} \sum_{y_{ik} \in I} \left\{ \sum_{j=1}^{n_s} [\sigma(y_{ik} - b_j)(\beta - \sigma(y_{ik} - b_j)) - \right.$$

$$\sigma(y_{ik} - a_j)(\beta - \sigma(y_{ik} - a_j)) +$$

$$\sigma(w - y_{ik})(\beta - \sigma(w - y_{ik})) -$$

$$\left. \sigma(y_{ik} - e)(\beta - \sigma(y_{ik} - e))]\left( \frac{s_i s_k}{s_i - s_k} \right) \right\} -$$

$$\eta_2(1 - \sigma(d_i - e_i; \alpha_i'))\sigma(d_i - e_i; \alpha_i')) +$$

$$\eta_3 \begin{cases} h_k \alpha_k (1 - \sigma(u_k; \alpha_k))\sigma(u_k; \alpha_k) & \text{for } u_k \le t_c \\ m_k & \text{for } u_k > t_c. \end{cases}$$

Illustration of the Gradient Search Process

An example with twelve trains, six in each direction, running in a 150 mile corridor over an eight hour time window is provided below.

Figure 13:
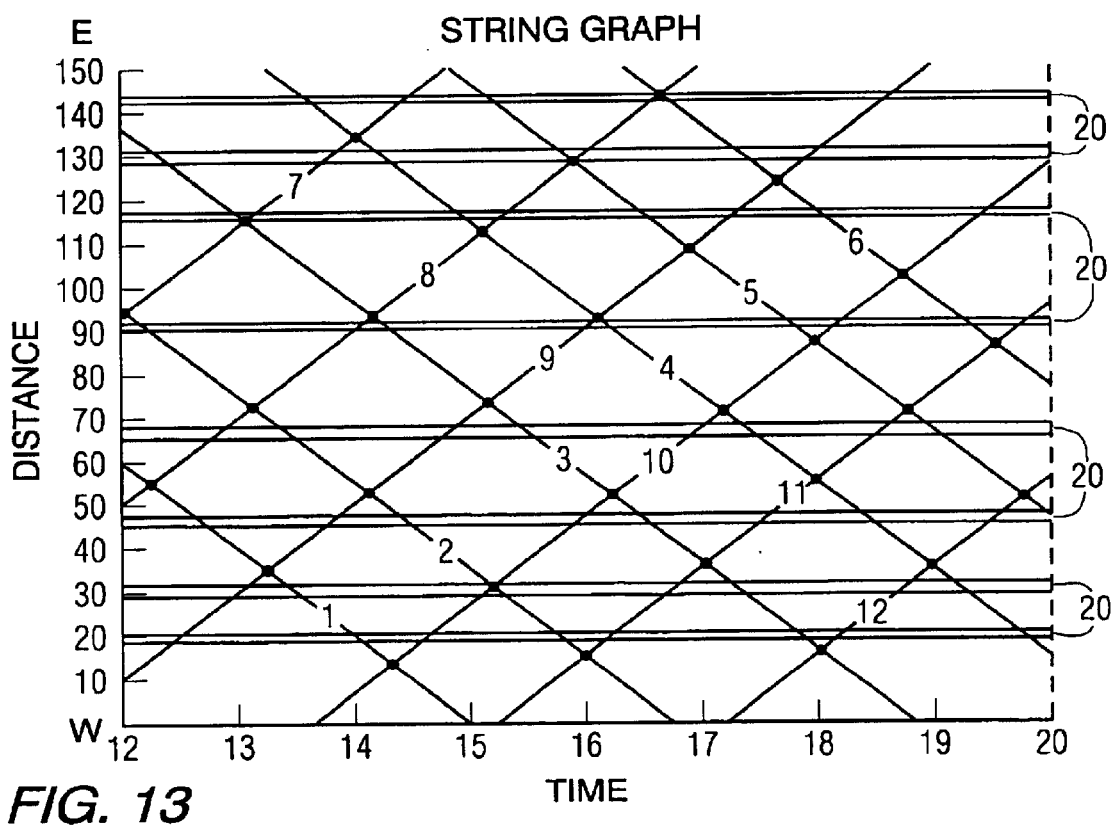
FIG. 13 is an initial infeasible string graph schedule for twelve trains.

FIG. 13 shows the string graph for the initial unprocessed schedule (i.e., train departure times were chosen without regard to feasibility), and Table 1 below shows the information concerning each train. There are twelve trains on the corridor and the time frame of interest is eight hours (12:00 to 20:00). The columns of the table indicate:

(1) the train identification number (shown in the string graph as an integer at the center of each associated string)
(2) direction of travel (Direction),
(3) earliest acceptable departure time (Min. Departure),
(4) actual departure time (Act. Departure),
(5) latest arrival time before penalty is incurred (Max. Arrival)
(6) initial speed (Speed),
(7) train length (Length),
(8) initial penalty incurred for being late (Penalty Step),
(9) per hour penalty for each hour late (Penalty Slope),
(10) maximum permitted speed (Max. Speed).

TABLE 1

Initial Train Schedule, before Gradient Search

| Train ID | Direction | Min. Departure | Act. Departure | Max. Arrival | Speed (mph) | Length (mi.) | Penalty Step | Penalty Slope | Max. Speed |
|---|---|---|---|---|---|---|---|---|---|
| 1 | west | 6:45 | 7:30 | 17:45 | 20.0 | 1.1 | 1.000 | 0.450 | 50.0 |
| 2 | west | 8:30 | 9:15 | 19:45 | 20.0 | 1.2 | 1.500 | 0.150 | 35.0 |
| 3 | west | 11:00 | 11:20 | 21:30 | 30.0 | 1.4 | 1.000 | 0.300 | 45.0 |
| 4 | west | 13:00 | 13:15 | 23:30 | 20.0 | 1.0 | 0.000 | 0.000 | 50.0 |
| 5 | west | 14:30 | 14:50 | 25:00 | 20.0 | 1.4 | 2.000 | 0.200 | 40.0 |
| 6 | west | 16:00 | 16:20 | 26:30 | 20.0 | 1.1 | 1.500 | 0.000 | 40.0 |
| 7 | east | 7:00 | 7:20 | 18:00 | 20.0 | 0.9 | 2.500 | 1.000 | 35.0 |
| 8 | east | 9:00 | 9:30 | 19:45 | 20.0 | 1.1 | 1.500 | 0.300 | 50.0 |
| 9 | east | 11:00 | 11:30 | 21:30 | 20.0 | 1.3 | 0.000 | 0.000 | 35.0 |
| 10 | east | 13:30 | 13:40 | 24:00 | 20.0 | 1.1 | 0.000 | 0.500 | 40.0 |
| 11 | east | 15:00 | 15:15 | 26:00 | 20.0 | 1.1 | 1.500 | 0.250 | 40.0 |
| 12 | east | 17:00 | 17:15 | 27:00 | 20.0 | 1.0 | 0.000 | 0.000 | 40.0 |

The gradient search as discussed above was initiated with departure times being varied and train speeds held constant, and with the cost function including the penalties for early departure and economic penalties (i.e., late arrival). The resulting string graph is shown in FIG. 14.

Figure 14:
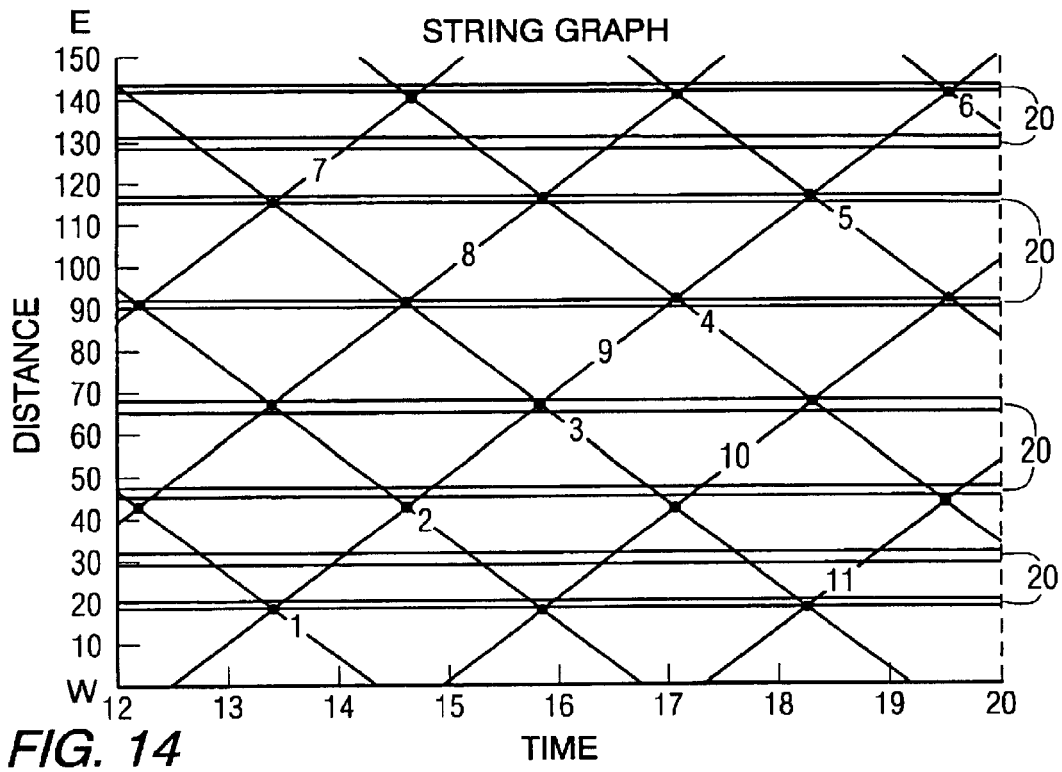
FIG. 14 is a string graph for trains of FIG. 13 after a gradient search of the present invention.

Comparing FIG. 14 with FIG. 13, it can be seen that of the initial 31 points of intersection of train trajectories, in FIG. 13, nine were close to feasible, where we will define "close" rather arbitrarily in terms of the intersection dots at least touching a siding 20. Thus 23 intersection points were not close to feasible. In the final version of FIG. 14 some intersection points have disappeared, primarily because trains four and five have joined together in a convoy (identified in FIG. 14 by the number 5 on the coincident strings), and some trains have been pushed off the string graph. In FIG. 14, there are only two intersection points not meeting the definition of close.

Table 2 below shows the final schedule, which resembles the original schedule except for the actual departure times of trains. Note that all trains require 7.5 hours from actual departure until arrival at the destination, so only train six is late, but train six is in fact only four minutes late.

positions of intersection points at sidings. In order to provide a standard basis for that process, in this embodiment we will first adjust the results of the gradient search so that the intersection points of train trajectories have y-coordinates precisely at the centerpoints of sidings. The intersection points must be moved in order of increasing time coordinate, to assure that all prior intersection points have already been appropriately adjusted.

To center intersection points at sidings and side specific trains, the train speeds of the trains involved must be modified somewhat. Of course, modifying a train's speed at any point could affect its trajectory downline, which would move the positions of its future meets with other trains. This is avoided by requiring that the centered intersection points remain fixed, and that train speeds be varied as necessary to meet that requirement. More specifically, the train that will not be sided at a given intersection point will be constrained to pass through the centered intersection point, and the train that will be sided will undergo speed adjustments as needed to arrive and side before the opposed train is within an interfering (i.e., minimum stopping distance) of the siding train.

TABLE 2

Train Schedule after Gradient Search

| Train ID | Direction | Min. Departure | Act. Departure | Max. Arrival | Speed (mph) | Length (mi.) | Penalty Step | Penalty Slope | Max. Speed |
|---|---|---|---|---|---|---|---|---|---|
| 1 | west | 6:45 | 6:50 | 17:45 | 20.0 | 1.1 | 1.000 | 0.450 | 40.0 |
| 2 | west | 8:30 | 9:17 | 19:45 | 20.0 | 1.2 | 1.500 | 0.150 | 35.0 |
| 3 | west | 11:00 | 11:41 | 21:30 | 20.0 | 1.4 | 1.000 | 0.300 | 45.0 |
| 4 | west | 13:00 | 14:10 | 23:30 | 20.0 | 1.0 | 0.000 | 0.000 | 50.0 |
| 5 | west | 14:30 | 16:37 | 25:00 | 20.0 | 1.4 | 2.000 | 0.200 | 40.0 |
| 6 | west | 16:00 | 19:04 | 25:30 | 20.0 | 1.1 | 1.500 | 0.000 | 40.0 |
| 7 | east | 7:00 | 7:40 | 18:00 | 20.0 | 0.9 | 2.500 | 1.000 | 35.0 |
| 8 | east | 9:00 | 10:03 | 19:45 | 20.0 | 1.1 | 1.500 | 0.300 | 50.0 |
| 9 | east | 11:00 | 12:29 | 21:30 | 20.0 | 1.3 | 0.000 | 0.000 | 35.0 |
| 10 | east | 13:30 | 14:59 | 24:00 | 20.0 | 1.1 | 0.000 | 0.500 | 40.0 |
| 11 | east | 15:00 | 17:20 | 26:00 | 20.0 | 1.1 | 1.500 | 0.250 | 40.0 |
| 12 | east | 17:00 | 19:48 | 27:00 | 20.0 | 1.0 | 0.000 | 0.000 | 40.0 |

Improving the Gradient Search Result by Speed Adjustments

In this embodiment the gradient search result is modified by adjusting train speeds between sidings to achieve better siding meets. The gradient search process brought train intersections near, but may not have brought them exactly to the center points of sidings. This embodiment includes a technique for accounting for actual siding delays by changing intersiding speeds of trains as necessary to preserve the The intersection points are processed in of increasing time order, so that all downline adjustments of trajectories may account for earlier modifications. As each intersection point is processed, the decision as to which train to side may depend on various criteria, which can be established as special rules auxiliary to the overall algorithm. For example, if only one of the two trains is too long for the siding, then the other train must be sided. Another special case would be invoked for a train which could not restart if it sided on an upgrade of the corridor (that is, it could not generate sufficient tractive effort to move uphill).

If there are no special circumstances dictating that one of the two trains should side, then the criteria for deciding the train to side is that of train speed: in effect, siding a train requires that it arrive "early" at the siding, relative to the centered intersection point, so that it can slow down and pull into the siding without interference from the opposed train. Arriving early implies that the train must obtain a speed greater than that which was nominally assigned by the gradient-search process of the present invention, and there is of course, some practical upper limit on train speed, as will be discussed below. The siding decision must be made based on which of the two trains will be driven less far toward its upper limit, given that it must be sided. Once the decision is made, the speed and arrival times of both trains are fitted to the actual requirement of siding the train.

Figure 15:
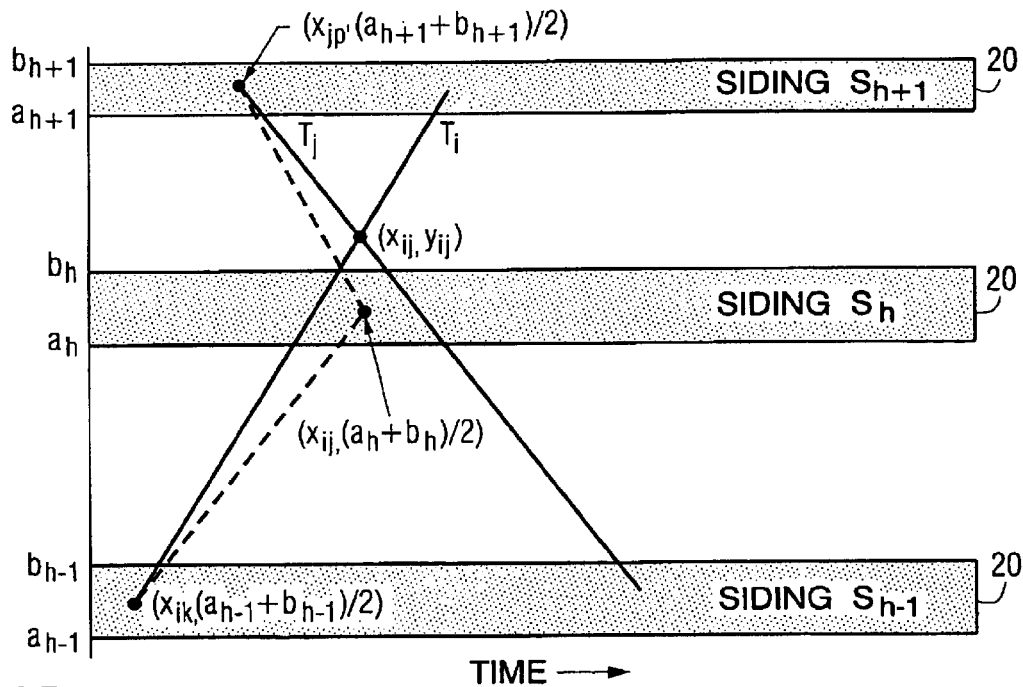
FIG. 15 shows the process whereby intersection points are moved to a siding center.

FIG. 15 shows such a situation, where the intersection point $(x_{ij}, y_{ij})$ of trains $T_i$ and $T_j$ is to be moved to the center of siding $S_h$ (designated by point $(x_{ij}, (a_h+b_h)/2))$, given that the immediately prior intersection points affecting trains $T_i$ and $T_j$ have already been adjusted. Clearly the speeds needed for train $T_i$ (from $S_{h-1}$ to $S_h$) and for $T_j$ (from $S_{h+1}$ to $S_h$) are given by $$s_{i,h-1} = \frac{c_h - c_{h-1}}{x_{ij} - x_{ik}}, \text{ and} \qquad (10\text{-}2)$$

$$s_{jh} = \frac{c_{h+1} - c_h}{x_{ij} - x_{jp}} \text{ where} \qquad (10\text{-}3)$$

$$c_h = \frac{b_h - a_h}{2} \text{ for } h = 1, \ldots, n_s,$$

and trains $T_k$, $T_p$ are the trains representing the immediately previous meets of with trains $T_i$ and $T_j$, respectively.

Figure 16:
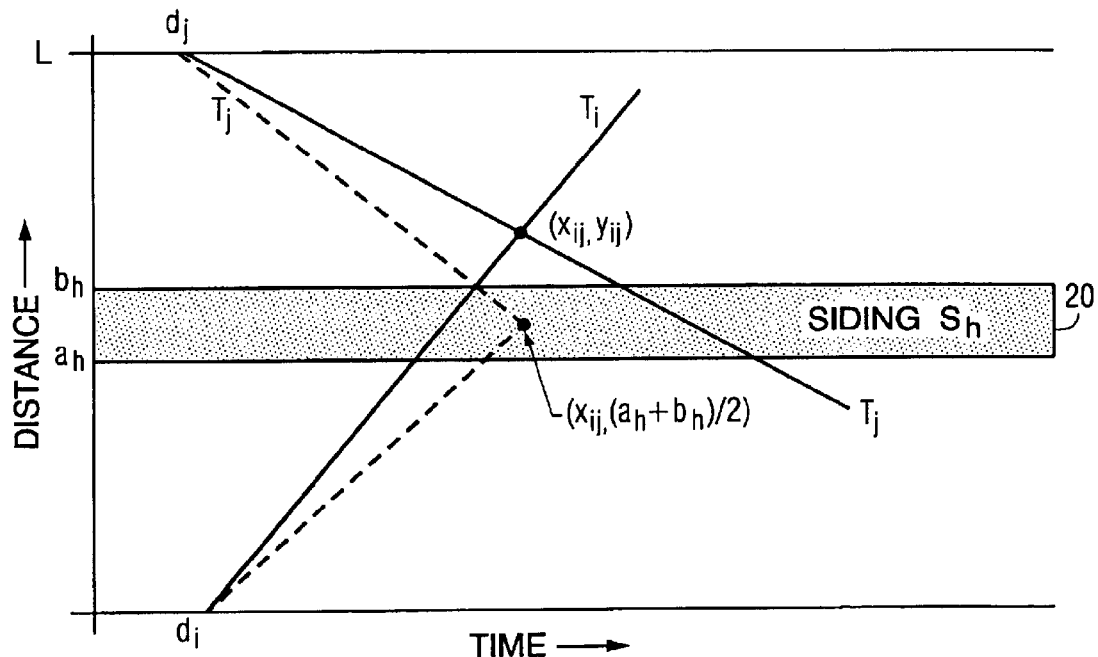
FIG. 16 shows moving the first intersection point to a siding center.

There is also the case where there is no prior point of intersection, i.e., where the intersection point $(x_{ij}, y_{ij})$ is the first intersection point for either or both of $T_i$ or $T_j$, as shown in FIG. 16. In this case, the speed needed to assure intersection at the siding center is given by $$s_{i,h-1} = \frac{c_h}{x_{ij} - d_i} \text{ for } T_i \text{ eastbound, and} \qquad (10\text{-}4)$$

$$s_{ih} = \frac{L - c_h}{x_{ij} - d_i} \text{ for } T_i \text{ westbound.} \qquad (10\text{-}5)$$

Figure 17:
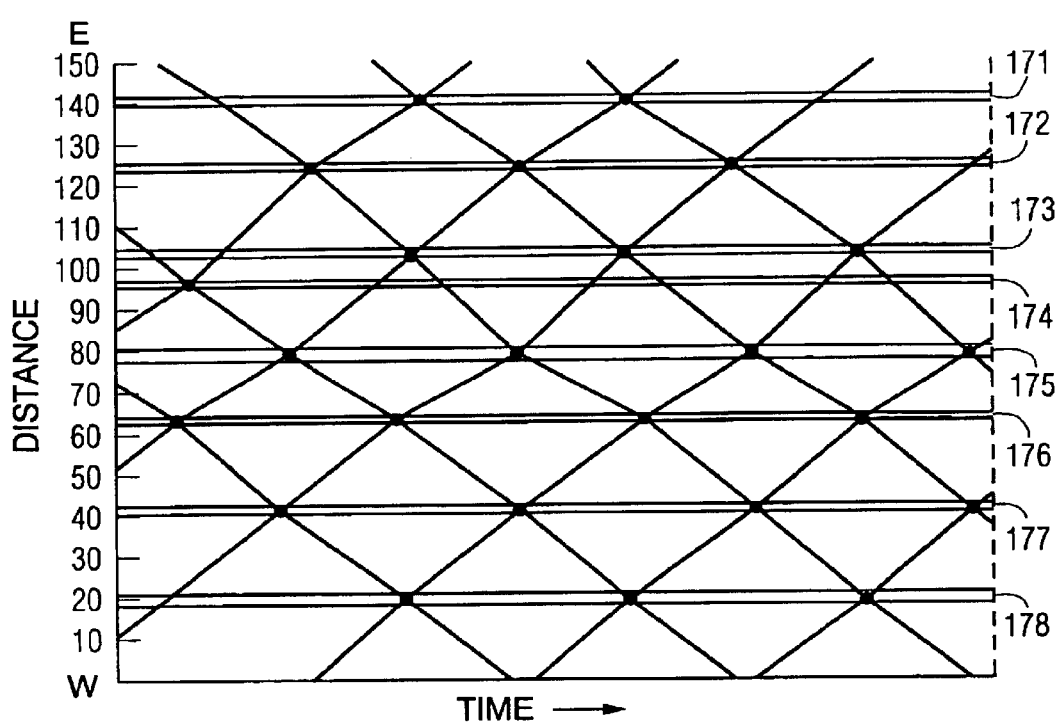
FIG. 17 illustrates the process of speed adjustments to center all meets.

FIG. 17 illustrates the result of centering all meets for the gradient search results shown in FIG. 14, on sidings 181 through 188 by adjusting train speeds between sidings. In effect, rather minor speed adjustments are usually sufficient to center all meets.

Resolving Siding Conflicts

Figure 18A:
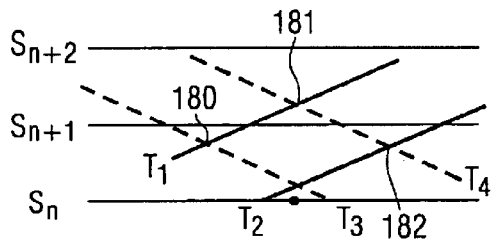
Figure 18B:
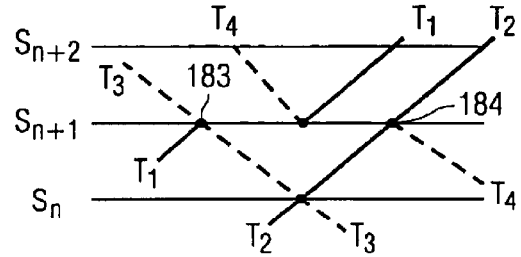

There is one possible undesirable side-effect that may arise when centering meets or passes, as illustrated in FIGS. 18A and 18B. After executing the gradient search process, the initial intersection points are shown in FIG. 18A. Train $T_1$ intersects train $T_3$ at point 180, train $T_1$ intersects train $T_4$ at point 181 and train $T_2$ intersects train $T_4$ at point 182. The result of centering all the meets represented by points 180, 181, and 182, by speed adjustments as discussed above, is shown in FIG. 18B. Train $T_1$ is sided on siding $S_{n+1}$ at point 183 because of its meet with train $T_3$, and train $T_4$ is sided at siding $S_{n+1}$ at point 184 because of its meet with train $T_2$.

The difficulty created is that trains $T_1$ and $T_2$ must both be sided on the same siding $S_{n+1}$, although they are traveling in opposite directions, because one train is waiting on the siding that the other train must occupy before the former train pulls out. This cannot be accomplished, so the result of centering all of the meets will in a case like this be an infeasible schedule. We will denote these artifacts as siding conflicts.

Figure 19A:
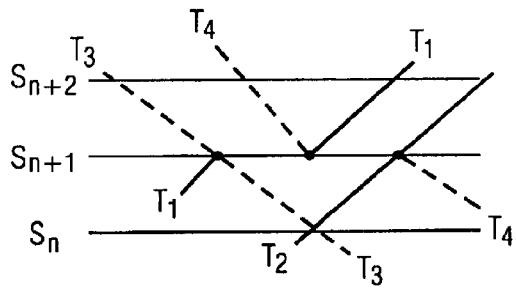
FIGS. 19A and 19B illustrates the two types of siding conflict.
Figure 19B:
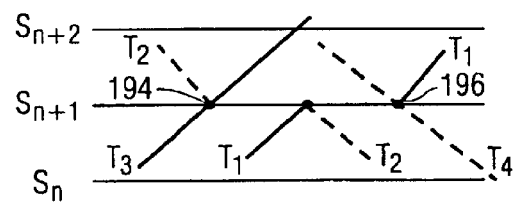

The meet-centering process can produce two types of siding conflicts, as shown in FIGS. 19A and 19B. FIG. 19A repeats the siding problem illustrated in FIG. 18B. FIG. 19B illustrates another siding conflict situation, but as in FIGS. 18B and 19A, the problem is again that two trains traveling in opposite directions must be sided on the same siding. Trains $T_2$ and $T_3$ intersect at point 194, with the former sided, while trains $T_1$ and $T_4$ intersect at point 196, with the former sided. Both of the siding conflict types shown in FIGS. 19A and 19B can be resolved by moving the meet of the conflicting trains to an adjacent siding, as shown in FIGS. 20A and 20B.

Figure 20A:
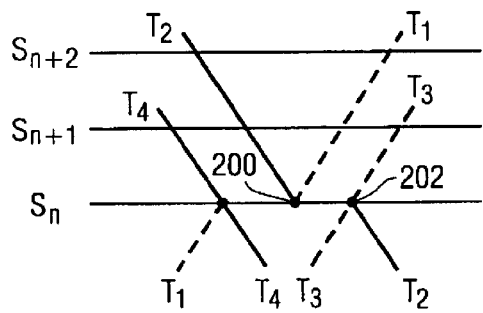
FIGS. 20A and 20B illustrate the resolution of certain siding conflicts.

FIG. 20A represents a siding conflict identical to FIG. 19A. The conflict at the meet point 200 is resolved by moving it upward to point 201 in FIG. 20B. This is accomplished by accelerating or decelerating the necessary trains between adjacent sidings. Similarly, the siding conflict of FIG. 19B can be resolved by moving it downward.

Figure 20B:
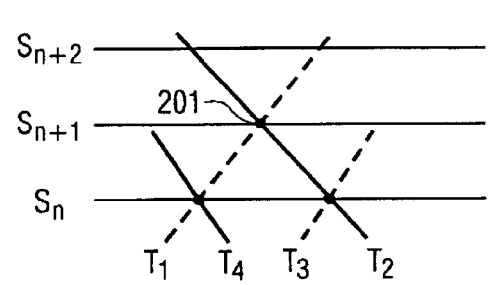
Figure 21A:
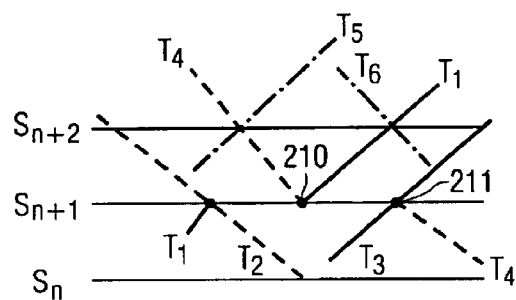
FIGS. 21A and 21B illustrate the "unresolvable" siding conflict.
Figure 21B:
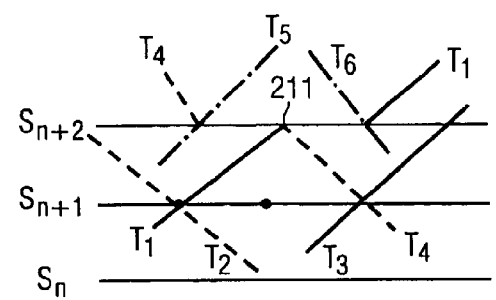

This process of resolution as illustrated by FIG. 20B (that is, the upward and downward movement of meets to resolve siding conflicts) will work if the trains in conflict have at most one meet at the siding to which their meet is moved, but will not work if both trains have meets at the siding to which their meet is moved, as shown in FIGS. 21A and 21B. In that case, the resolution of the original siding conflict at point 210 in FIG. 21A by moving it to point 211 in FIG. 21B, simply creates yet another siding conflict.

However, there is an inductive way to resolve all siding conflicts which might occur from the meet centering process: if we call the siding conflict of FIGS. 18B and 19A an upward-resolvable conflict, and the siding conflict of FIG. 19B a downward-resolvable conflict, it follows that any siding conflict occurring on siding $S_1$ is in fact resolvable, because the conflict point may be pushed to the end of the corridor, where any meets with the two trains involved can be avoided by slightly modifying the departure/arrival times of the involved trains as necessary.

Figure 22A:
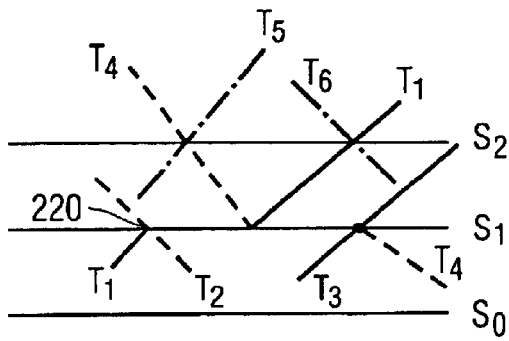
FIGS. 22A through 22D illustrate resolution of both types of siding conflicts.
Figure 22B:
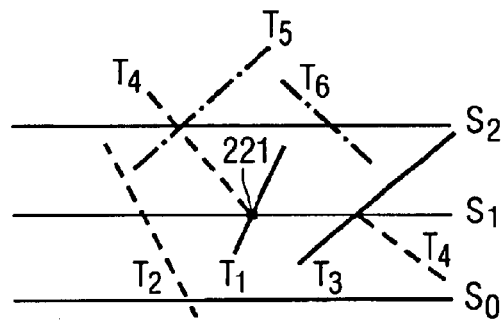
Figure 22C:
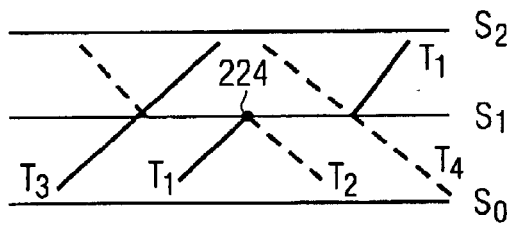
Figure 22D:
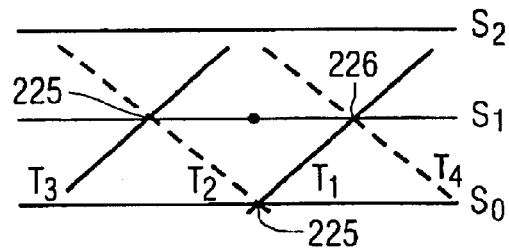

This is illustrated in FIGS. 22A–D, where the illustrations on the right provide resolutions of the siding conflicts on the left. The intersection at point 220 in FIG. 22A is moved to point 221 in FIG. 22B, by reducing the speed of train $T_1$. In FIG. 22C, the siding conflict at point 224 is removed by moving the intersection of point of trains $T_1$ and $T_2$ to point 225. Now feasible sidings can occur at intersection points 225 and 226.

Now we may proceed by induction to show that all siding conflicts are resolvable, with the basis being provided by the techniques demonstrated in FIG. 22, and with the inductive assumption being that all siding conflicts occurring on siding $S_{n-1}$, for $n \geq 2$, can be resolved by pushing the conflict point to the end of the corridor.

Figure 23A:
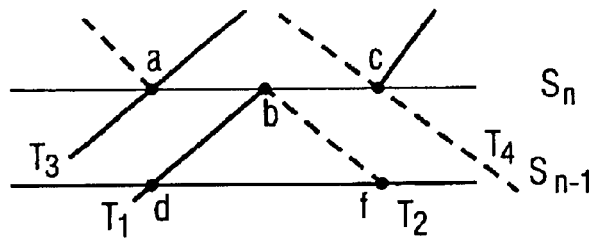
FIGS. 23A through 23E show the cases for downward resolvable siding conflicts.
Figure 23B:
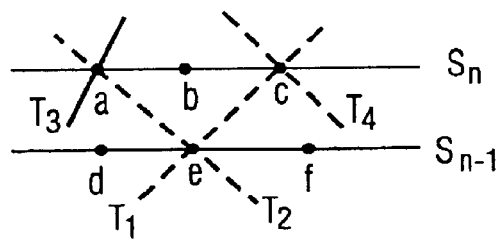
Figure 23C:
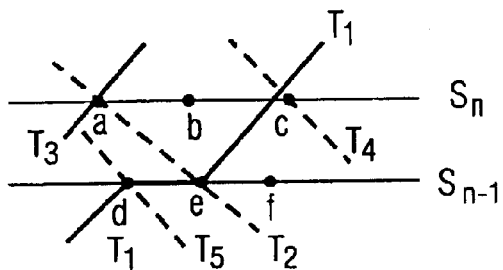
Figure 23D:
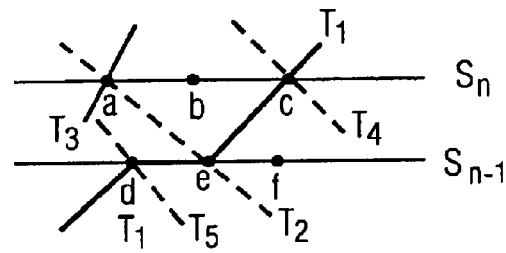
Figure 23E:
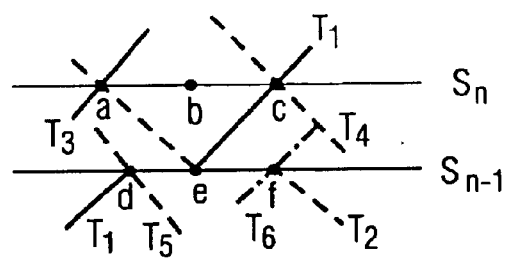

FIGS. 23A through 23E illustrate a downward-resolvable siding conflict on siding $S_n$, and it is shown that for all possible variations of that conflict, it can be resolved to a situation where, at worst, it results in a new siding conflict resulting on siding $S_{n-1}$. By our inductive assumption, any such induced siding conflicts can be resolved. FIG. 23A shows the original meet situation. FIG. 23B (case 1) shows the resolution if trains $T_1$ and $T_2$ have no meets at points d and f. FIG. 23C (case 2$a$) shows the resolution when train $T_1$ has a meet at point d, train $T_2$ has no meet at point f, and train $T_5$ is not sided. FIG. 23D (case 2$b$)) shows the resolution when train $T_1$ has a meet at point d, train $T_2$ has no meet at point f, and train $T_5$ is sided. The resolution of case 3 (not shown) where train $T_1$ has no meet at point d, train $T_2$ has a meet at point f, is identical to case 2a and 2b. Finally, case 4 is illustrated in FIG. 23E where trains $T_1$ and $T_2$ both have meets on siding $S_{n-1}$.

Figure 24A:
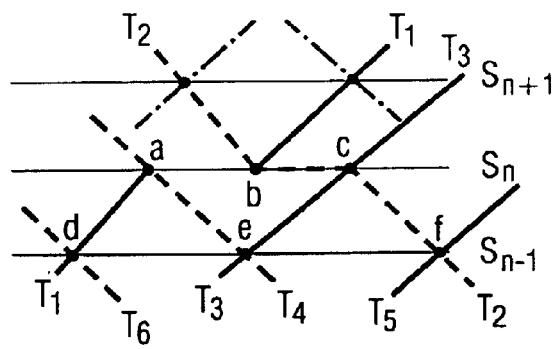
Figure 24B:
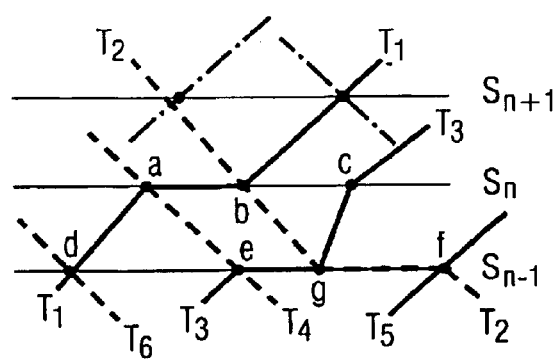

FIG. 24 shows a similar demonstration for an upward-resolvable siding conflict on $S_n$, except the illustration is limited to a worst case, with it being evident that cases with fewer constraining meets are also resolvable to, at worst, siding conflicts on $S_{n-1}$. FIG. 24A illustrates the original meet situation with the modification accomplished by moving the meet at point c to point g, as illustrated in FIG. 24B.

We conclude, finally, that although the meet centering process can produce infeasible string graphs because of the siding conflicts, all such siding conflicts can be resolved to feasible situations which do not include siding conflicts. When moving a meet point from one siding to the next lower one, there will usually be some horizontal latitude as to where to place it, and so to some degree, train speed limits can be favored. Note, however, that the resolution of these conflicts may result in some occasions where trains must travel at unrealizable speeds. This will be dealt with by introducing a new gradient optimization process in another embodiment of the present invention below.

Accounting for Siding Time

As described to this point, the invention permits an initial schedule of trains on the corridor, arranged without regard for meets and passes, to be moved toward a schedule which minimizes or eliminates meets or passes occurring at infeasible locations, i.e., not at sidings.

After the processes of improving the gradient search results by speed adjustments and resolving siding conflicts have been applied, as discussed above, to the original gradient search result, there has been created a string graph in which each train trajectory is depicted as a sequence of straight line segments, constrained to meet other train trajectories at the centerpoints of sidings. The string graph, adjusted after the gradient search as necessary to move all meets to centerpoints of sidings, will be called the incomplete string graph.

The gradient search and the speed adjustments produce a meet of two trains at a siding, but in one embodiment it does not actually account for the need for one train to side, or for the fact that the train has a length. To actually side one train, it must arrive at the siding far enough in advance of the other train to completely pull into the siding, and it must delay its departure until the other train is clear of the siding.

Figure 25:
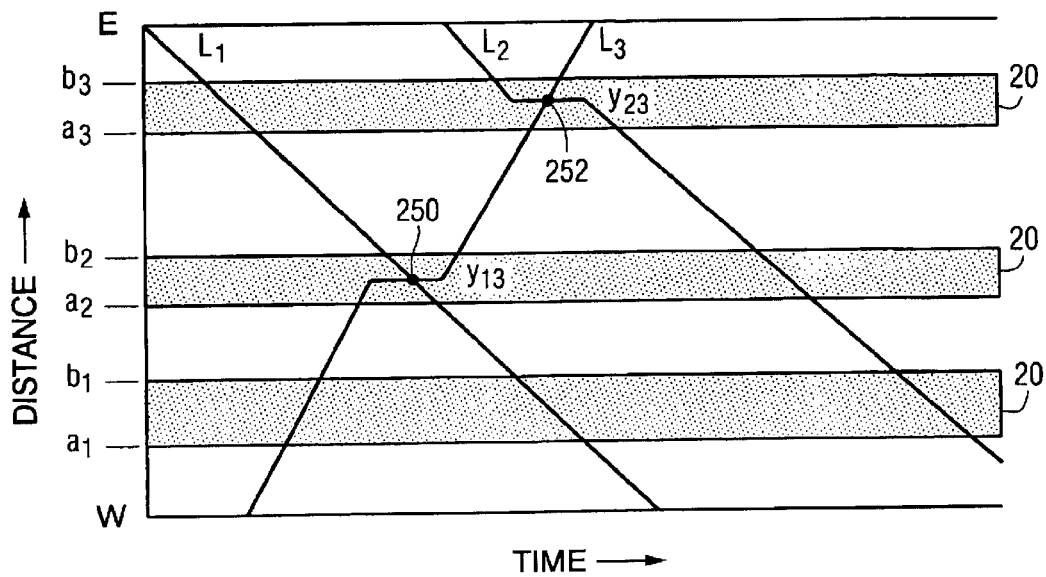
FIG. 25 illustrates train trajectories represented as broken line segments.

FIG. 25 illustrates this problem. To this point, a train trajectory has been approximated as a single unbroken line segment (as in FIG. 2), in actuality, it will take the form of a broken line segment if the corresponding train must be sided. In FIG. 25, the trains $T_2$ and $T_3$ must side, so the corresponding trajectories $L_2$ and $L_3$ reflect the required siding time with horizontal line segments 250 and 252 inserted into the trajectories. The minimum length of the horizontal segment is determined by the length and speed of the opposed train. Therefore the level of resolution into train trajectory planning must be improved in this embodiment to obtain an implementable train schedule, based on the results of the gradient search. It is necessary to develop the mathematics of siding trains, given that an initial schedule has been obtained using the gradient search process, above.

Defining the Train Trajectory Vector

Figure 26:
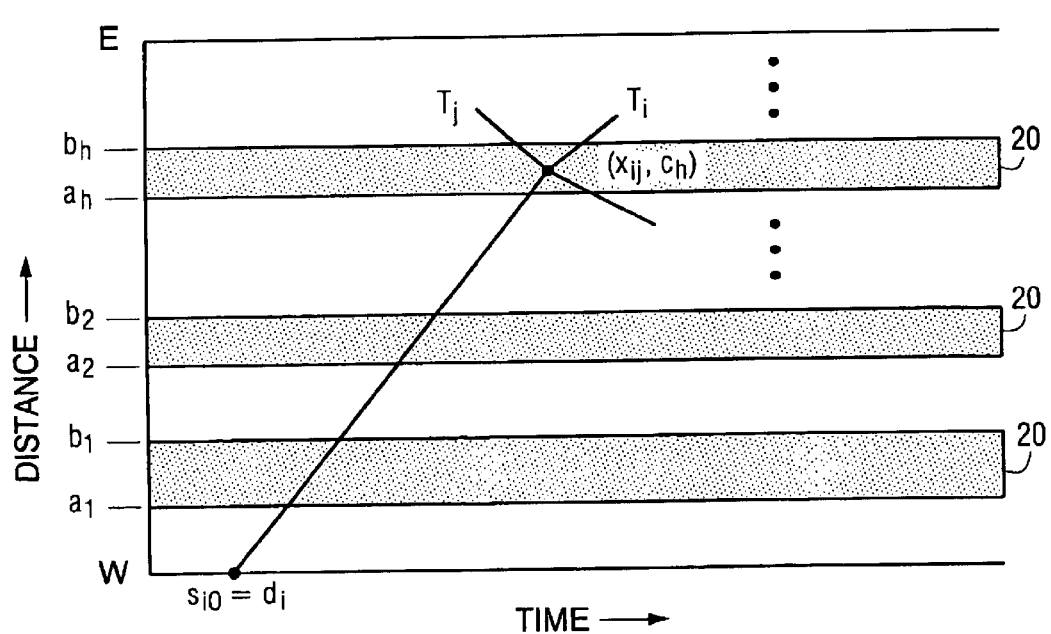
FIG. 26 is an evaluation of the train trajectory vector.

Implicit in the purely geometric format described to this point, are the numerical quantities needed to define the train trajectory vector of Equation 10-1. Specifically, for train $T_i$, the value of $b_{i0}$ ($T_i$ eastbound) or of $b_{i,n_s+1}$ ($T_i$ westbound) must be equal to the departure time $d_i$ of the train, which was determined by the gradient search process, with possible modification by the resolution of siding conflicts. Now for an eastbound train, assume that the first meet with another train occurs with train $T_j$ at siding $S_h$, h>0, thus we specifically know that $T_j$ must be at point ($x_{ij}$, $c_h$) on the string graph, as shown in FIG. 26. Then the speed $S_{ih}$ of train $T_i$, from its origin, must be $$s_{ih} = \frac{c_h}{x_{ij} - b_{i0}}, \quad (10\text{-}6)$$

and it follows that $b_{ik}$, for k=1, ..., h, and $e_{ik}$, for k=1, ... h−1, may be determined as follows.

$$b_{ik} = b_{i0} + \frac{a_k}{s_{ih}}, \text{ for } k = 1, \ldots, h, \text{ and} \quad (10\text{-}7)$$

$$e_{ik} = b_{i0} + \frac{b_k}{s_{ih}} \text{ for } k = 1, \ldots, h-1. \quad (10\text{-}8)$$

We can now proceed on the next line segment (i.e., from meet to meet) defining the trajectory of $T_i$ to obtain a speed, determined by the intersections of $T_i$ with other trains, from which we can determine the times of arrival of $T_i$ at all intermediate siding edges, thereby filling in all of the data required for the train trajectory vector of $T_i$ except the siding decision values $B_{ih}$. Siding decisions have not yet been considered, so these values will be defined later.

It should be clear that an analogous process can be defined for westbound trains, so we have inductively defined all train trajectory vectors using the incomplete string graph.

Extending the Definition of the Train Trajectory

The definition of train trajectories as equations relating distance along the corridor to time, as given by Equation 3-3, does not accommodate the siding time and siding decisions required for some trains. Instead, it provided a characterization of trajectories as straight line segments, for the purpose of minimizing the computations needed for the gradient search process. In order to generalize the trajectory, in this embodiment the simple definition of a trajectory will be modified by adding parameters accounting for train delays at sidings.

Where a corridor has $n_S$ sidings, we begin by defining the train trajectory vector, and for notational convenience, we will designate the west end of the corridor as siding $S_0$, and the east end of the corridor as siding $S_{n_S+1}$, with the recognition that these "sidings" have a length of zero. Given this convention, define the train trajectory vector for train $T_i$ as $$\vec{\mu}_i = \theta_i, b_{i0}, b_{i1}, \ldots, b_{i,n_S+1}, e_{i1}, e_{i2}, \ldots, e_{in_S}, B_i, \ldots, B_{in_S}) \quad (10\text{-}1),$$

where $\theta_i$ = the direction of train $T_i$ (already defined in Equation 3 – 4), $b_{ih}$ = the time at which train $T_i$ reaches siding $S_h$ ($h = 0, \ldots, n_{s+1}$), $e_{ih}$ = the time at which train $T_i$ departs the siding $S_h$ ($h = 1, \ldots, n_s$), $B_{ih} = \begin{cases} 1 & \text{if } T_i \text{ is sided on } S_h \\ 0 & \text{if } T_i \text{ is not sided on } S_h \end{cases}$ The times at which a train reaches or departs from a siding will be the time at which the head of the train reaches the upstream or downstream ("downstream" or "upstream" is defined relative to the direction of the train) end of the siding, respectively. Also for consistency, since siding $S_i$ has endpoints $a_i$ and $b_i$, as measured from the west end of the corridor, let $b_0$ denote the beginning of the corridor, and $a_{n_s+1}$, denote the end of the corridor.

Detailing the Siding Process

FIG. 14 demonstrated the result of the gradient search process, and demonstrates that the search process has the capability to adjust departure times so that train trajectories intersect at sidings. The gradient search process cannot usually perfectly align all meets at sidings, and so the meet-centering process was also described above. Once we have in fact placed all meets at sidings, we might use train speed adjustments to interpret the resulting string graph as showing that the engines of trains pass exactly at the centerpoints of sidings.

Now the focus will be on a technique by which a string graph such as that in FIG. 14, with meets centered on sidings, as discussed above, can be modified further to provide a full, feasible string graph schedule with trains sided as necessary. We will assume that we begin with all train meets centered at sidings, and all possible siding conflicts resolved as necessary. The process will be inductive: we will begin by ordering the collection of all intersection points on the incomplete string graph according to the time of intersection, and we will proceed to modify them, in time order, so that each intersection point reflects a feasible siding arrangement.

Figure 27:
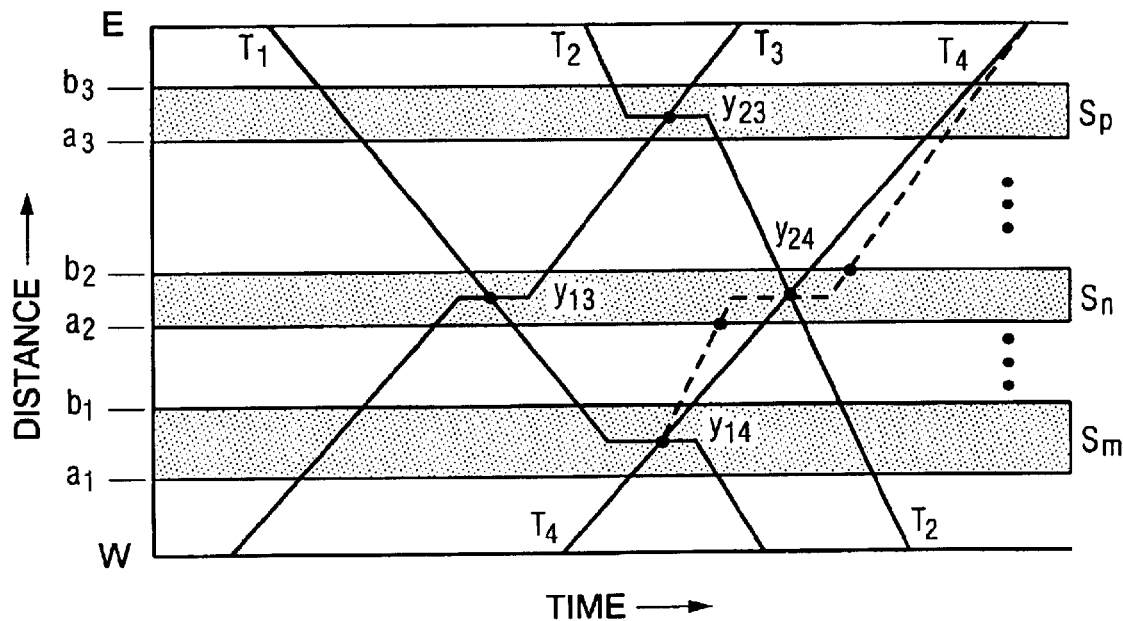
FIG. 27 shows an adjustment of train trajectory to accommodate siding delays.

FIG. 27 illustrates the technique to be applied, as it is applied to intersection point $y_{24}$. It is assumed that all intersection points of the string graph prior in time to $y_{24}$ have already been modified by this process, so that the required time and speed data concerning trains $T_2$ and $T_4$, prior to point $y_{24}$ are in fact valid. Of the two trajectories passing though $y_{24}$, we will choose to side train $T_4$, and the modification of trajectory for $T_4$ is indicated by the dashed sequence of line segments. Effectively, we require that $T_4$ operate at a higher speed from the last intersection point on the trajectory (relative to the incomplete string graph) in order to arrive at siding $S_n$ so that the last car of $T_4$ actually enters the siding before the engine of train $T_2$ arrives at the west end of siding $S_n$.

Figure 28:
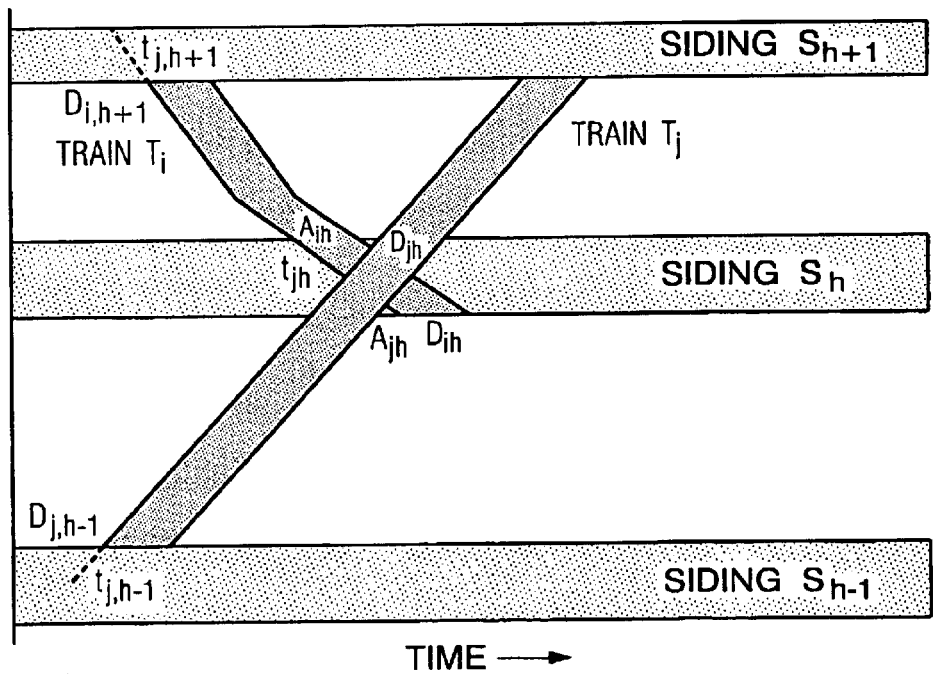
FIG. 28 shows siding details for a westbound sided train.
Figure 29:
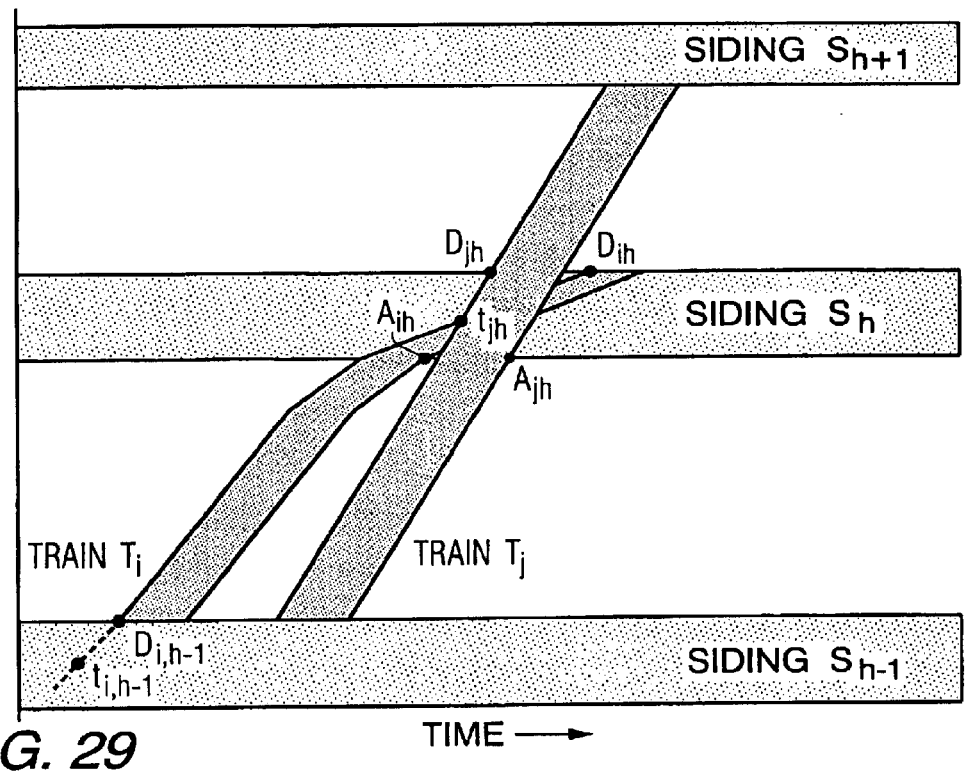
FIG. 29 illustrates siding details for eastbound passing trains.

FIGS. 28 and 29 represent possible meet/pass situations between trains. There are four basic cases, as follows:
(1) an eastbound train sides for a westbound train,
(2) a westbound train sides for an eastbound train,
(3) an eastbound train sides for a passing eastbound train,
(4) a westbound train sides for a passing westbound train.

There are also four variants on each case (for a total of 16 cases), depending on whether either or both of the trains involved were sided at the previous intersection point on their trajectories. This has significance because a train leaving a siding will have a lower initial speed (the pullout speed from the siding) across an intersiding segment than a train which has not been sided.

Essential parameters for the process will be defined in conjunction with FIGS. 28 and 29. Relative to any train $T_j$, let $A_{ih}$=the arrival time of the last car of $T_i$ at the upstream end of the siding $S_h$, $D_{ih}$=the time at which the head of $T_i$ arrives at the downstream edge of siding $S_h$, $t_{ih}$=the time at which a train $T_i$ not sided at $S_h$ passes the midpoint of the siding $S_h$, $v_h$=the pullin/pullout speed of any train for siding $S_h$, $p(i,h)$=the siding at which $T_i$ had the most recent meet before the present meet at $S_h$.

$f_i(v)$=the minimum stopping time for train Ti at speed v. The approximation used for this function is explained in Appendix B.

Although the following notation is not new, we review it here for convenience: let $a_h$=the coordinate of the western end of siding $S_h$, $b_h$=the coordinate of the eastern end of siding $S_h$, $M_i$=the length of train $T_i$.

L=the length of the corridor (with the western end being the origin), and finally, let $$c_h = \frac{a_h + b_h}{2}, \text{ the coordinate of the midpoint of siding } S_h. \quad (10\text{-}9)$$

Relative to the earlier descriptors of the train trajector vector for train $T_i$ (Equation 10-1), note that $$D_{ih} = e_{ih} \quad (10\text{-}10),$$

and, for an unsided train passing siding $S_h$, assumed to maintain constant speed across the extent of the siding, $$t_{ih} = \frac{b_{ih} + e_{ih}}{2}, \quad (10\text{-}11)$$

the value of which was established by centering all meets at sidings.

In the following derivations, the trains meeting at a siding $S_h$ will be trains $T_i$ and $T_j$, and $T_i$ will always be the train to be sided. The apparent constraints that must be met for $T_i$ to be sided (see FIGS. 28 and 29), are $$A_{ih} \leq D_{jh} \quad (10\text{-}12),$$

and $$D_{ih} \geq A_{jh} \quad (10\text{-}13).$$

These two constraints are somewhat idealized, and both need modifications. First, it would be unsafe to apply inequality 10-12 literally, because if, for any reason, train $T_i$ were to stop short of being fully sided, then train $T_j$ might in fact be too close to stop in time to avoid a collision. Thus condition 10-12 should be replaced with $$A_{ih} \leq D_{jh} - f_j(v_j) \quad (10\text{-}14),$$

where $v_j$ is the speed of $T_j$ as it approaches siding $S_h$.

Condition 10-13 also requires a modification, because it could be the case that $T_j$ could actually clear the downstream end of the siding (relative to $T_i$) before $T_i$ could get there, even if $T_i$ pulled into the siding, continued moving at maximum siding speed, and arrived at the downstream end of the siding. In that case, $D_{ih}$ is limited by the speed of $T_i$, not the position of $T_j$, and takes the minimum value $$D_{ih} = A_{ih} + \frac{b_h - a_h - M_i}{v_h}, \quad (10\text{-}15)$$

so the corrected version of Condition 10-14 is $$D_{ih} = \max\left\{A_{jh}, A_{ih} + \frac{b_h - a_h - M_i}{v_h}\right\}. \quad (10\text{-}16)$$

Constraints 10-14 and 10-16 then provide the practical constraints by which meets and passes can be planned.

The quantities in the inequalities are functions of the train speeds on the previous intersiding segments and of the departure times from the last siding: inductively, we assume that the departure times for both trains from their previous meets are known, and we must derive the speeds needed by both trains to arrive at the siding $S_h$ so that constraints 10-14 and 10-16 are met. The known quantities, for the trains $T_i$ and $T_j$, at the beginning of the inductive step, are (1) $t_{jh}$, the time at which $T_j$ should be at the center of $S_h$ (Equation 10-11),
(2) $D_{i,p(i,h)}$, for $T_i$,
(3) $D_{j,p(j,h)}$ for $T_j$.

To satisfy constraints 10-14 and 10-16, we must determine values for $D_{ih}$, $D_{jh}$, $A_{ih}$, and $A_{jh}$, in terms of speeds, and then solve the constraint inequalities for the speeds required to meet the constraints.

The speeds so obtained are for $T_i$ and $T_j$ from their last meets to their common meet, and when we solve the constraint inequalities (subject to the siding choices made) to obtain these train speeds, we will also determine the values corresponding to items (1)–(3) above for trains $T_i$ and $T_j$ at siding $S_h$, thereby completing the inductive process. The basis of the induction will be taken up later.

The Inductive Step for the Unsided Train

We first determine the speeds, from the requirements that the unsided train pass the center of siding $S_h$ at time $t_{jh}$:

$$t_{jh} = \begin{cases} D_{j,p(j,h)} + \dfrac{c_h - b_{p(j,h)}}{s_{j,h-1}} & \text{for } T_j \text{ eastbound, and not sided at } S_{p(j,h)} \\ D_{j,p(j,h)} + \dfrac{M_j}{v_{p(j,h)}} + \dfrac{c_h - b_{p(j,h)} - M_j}{s_{j,h-1}} & \text{for } T_j \text{ eastbound, and sided at } S_{p(j,h)} \\ D_{j,p(j,h)} + \dfrac{a_{p(j,h)} - c_h}{s_{j,h}} & \text{for } T_j \text{ westbound and not sided at } S_{p(j,h)} \\ D_{j,p(j,h)} + \dfrac{M_j}{v_{p(j,h)}} + \dfrac{a_{p(j,h)} - c_h - M_j}{s_{jh}} & \text{for } T_j \text{ westbound and sided at } S_{h+1}. \end{cases} \quad (10\text{-}17)$$

Note that there are also two special cases of Equations 10-17, namely $$t_{j,0} = d_j \text{ for } T_j \text{ eastbound,}$$
$$t_{j,n_S+1} = d_j \text{ for } T_j \text{ westbound} \quad (10\text{-}18)$$

and for notational consistency, we define $$c_0 = 0,$$

and $$c_{n_S+1} = L \quad (10\text{-}19).$$

Additionally, the validity of equation 10-17 requires that the distance between sidings $S_h$ and $S_{p(j,h)}$ exceed the length $M_j$ of train $T_j$.

From Equations 10-17, we may solve for the speeds required:

$$s_{j,h-1} = \frac{c_h - b_{p(j,h)}}{t_{jh} - D_{j,p(j,h)}}, \text{ for } T_j \text{ eastbound and not sided at } S_{p(j,h)}; \quad (10\text{-}20)$$

$$s_{j,h-1} = \frac{c_h - b_{p(j,h)} - M_j}{t_{jh} - D_{j,p(j,h)} - \dfrac{M_j}{v_{p(j,h)}}}, \quad (10\text{-}21)$$

for $T_j$ eastbound and sided at $S_{p(j,h)}$;

$$s_{jh} = \frac{a_{p(j,h)} - c_h}{t_{jh} - D_{j,p(j,h)}}, \text{ for } T_j \text{ westbound and not sided at } S_{p(j,h)}; \quad (10\text{-}22)$$

$$s_{jh} = \frac{a_{p(j,h)} - c_h - M_j}{t_{jh} - D_{j,p(j,h)} - \dfrac{M_j}{v_{p(j,h)}}}, \quad (10\text{-}23)$$

for $T_j$ westbound and sided at $S_{p(j,h)}$.

Now that the speed for the unsided train is determined, we may solve for $D_{jh}$ and $A_{jh}$, as follows:

$$D_{jh} = \begin{cases} t_{jh} + \dfrac{b_h - c_h}{s_{j,h-1}} & \text{for } T_j \text{ eastbound} \\ t_{jh} + \dfrac{c_h - a_h}{s_{j,h}} & \text{for } T_j \text{ eastbound;} \end{cases} \quad (10\text{-}24)$$

-continued $$A_{jh} = \begin{cases} t_{jh} - \dfrac{c_h - a_h + M_j}{s_{j,h-1}} & \text{for } T_j \text{ eastbound} \\ t_{jh} - \dfrac{b_h - c_h + M_j}{s_{jh}} & \text{for } T_j \text{ eastbound.} \end{cases} \quad (10\text{-}25)$$

For the unsided train, the determination of $D_{jh}$ in Equation 10-24 completes the inductive step of the siding algorithm. Note that if there are sidings between $S_h$ and $S_{p(j,h)}$, then the times of arrival and departure from those sidings is implicit in the speeds calculated in Equations 10-20 through 10-23. For k an index of such a siding, we have the following results:

$$b_{jk} = \begin{cases} e_{j,p(j,h)} + \dfrac{a_k - b_{p(j,h)}}{s_{j,h-1}} & \text{for } T_j \text{ eastbound and not sided at } S_{p(j,h)} \\ e_{j,p(j,h)} + \dfrac{M_j}{v_{p(j,h)}} + \dfrac{a_k - b_{p(j,h)} - M_j}{s_{j,h-1}} & \text{for } T_j \text{ eastbound and sided at } S_{p(j,h)} \\ e_{j,p(j,h)} + \dfrac{a_{p(j,h)} - b_k}{s_{j,h}} & \text{for } T_j \text{ westbound and not sided at } S_{p(j,h)} \\ e_{j,p(j,h)} + \dfrac{M_j}{v_{p(j,h)}} + \dfrac{a_{p(j,h)} - b_k - M_j}{s_{j,h}} & \text{for } T_j \text{ westbound and sided at } S_{p(j,h)}. \end{cases} \quad (10\text{-}26)$$

We may then write $$e_{jk} = \begin{cases} b_{jk} + \dfrac{b_k - a_k}{s_{k,h-1}} & \text{for } T_j \text{ eastbound} \\ b_{jk} + \dfrac{b_k - a_k}{s_{kh}} & \text{for } T_j \text{ westbound.} \end{cases} \quad (10\text{-}27)$$

The Inductive Step for the Sided Train

Half of the inductive step for the sided train $T_i$ is already complete, in that we can set the value $D_{ih}$ to be any value satisfying condition 10-16, although we would normally set that value to be as small as possible. However, we must also determine the speed required by $T_i$, from the previous siding $S_{p(i,h)}$ where $T_i$ had a meet to $S_h$, that will satisfy Condition 10-14. There are four cases, based on whether $T_i$ is eastbound or westbound, and did or did not side at $S_{p(i,\,h)}$. We express $A_{ih}$ for each of these cases, and then use Condition 10-14 to determine a minimum speed for $T_i$.

$$A_{ih} = \quad (10\text{-}28)$$

$$\begin{cases} D_{i,p(i,h)} + \dfrac{a_h - b_{p(i,h)}}{s_{i,h-1}} + \dfrac{M_i}{v_h} & \text{for } T_i \text{ eastbound and not sided at } S_{p(i,h)} \\ D_{i,p(i,h)} + \dfrac{M_i}{v_{p(i,h)}} + \dfrac{a_h - b_{p(i,h)} - M_i}{s_{i,h-1}} + \dfrac{M_i}{v_h} & \text{for } T_i \text{ eastbound and sided at } S_{p(i,h)} \\ D_{i,p(i,h)} + \dfrac{a_{p(i,h)} - b_h}{s_{ih}} + \dfrac{M_i}{v_h} & \text{for } T_i \text{ westbound and not sided at } S_{p(i,h)} \\ D_{i,p(i,h)} + \dfrac{M_i}{v_{p(i,h)}} + \dfrac{a_{p(i,h)} - b_h - M_i}{s_{ih}} + \dfrac{M_i}{v_h} & \text{for } T_i \text{ westbound and sided at } S_{p(i,h)}. \end{cases}$$

Since the value of $D_{jh}$ has been determined in the previous section, Equation 10-28 and Condition 10-12 lead to inequalities for the speed $s_{ih}$ or $s_{i,h-1}$ of $T_i$, as follows.

$$s_{i,h-1} \geq \dfrac{a_h - b_{p(i,h)}}{D_{jh} - f_j(v_j) - D_{i,p(i,h)} - \dfrac{M_i}{v_h}}, \quad (10\text{-}29)$$

for $T_i$ eastbound and not sided at $S_{p(i,h)}$, $$s_{i,h-1} \geq \dfrac{a_h - b_{p(i,h)} - M_i}{D_{jh} - f_j(v_j) - D_{i,p(i,h)} - \dfrac{M_i}{v_{p(i,h)}} - \dfrac{M_i}{v_h}}, \quad (10\text{-}30)$$

for $T_i$ eastbound and sided at $S_{p(i,h)}$, $$s_{ih} \geq \dfrac{a_{p(i,h)} - b_h}{D_{jh} - f_j(v_j) - D_{i,p(i,h)} - \dfrac{M_i}{v_h}}, \quad (10\text{-}31)$$

for $T_i$ westbound and not sided at $S_{p(i,h)}$, $$s_{ih} \geq \dfrac{a_{p(i,h)} - b_h - M_i}{D_{jh} - f_j(v_j) - D_{i,p(i,h)} - \dfrac{M_i}{v_{p(i,h)}} - \dfrac{M_i}{v_h}}, \quad (10\text{-}32)$$

for $T_i$ westbound and sided at $S_{p(i,h)}$, where $$v_j = \begin{cases} s_{j,h-1} & \text{for } T_j \text{ eastbound} \\ s_{jh} & T_j \text{ westbound.} \end{cases} \quad (10\text{-}33)$$

All of the quantities on the right sides of inequalities 10-29 through 10-32 are known, so the speed $s_{ih}$ or $s_{i,h-1}$ for train $T_i$ is determined, and the inductive step is complete. If a siding $S_k$ is intermediate to $S_h$ and $S_{p(i,h)}$, then Equations 25 and 26 establish the values of $e_{ik}$ and $b_{ik}$.

Establishing an inductive basis for the above depends only on the observation that the very first meet for any train $T_i$ or $T_j$ is preceded by the entry into the corridor from the east or west end. All of the computations then required to arrive and meet at siding $S_h$, subject to the constraints, are based on the original departure time of the relevant train, to which $D_{p(i,h)}$ or $D_{p(j,h)}$ is set equal, as the case may be.

Finally, the inductive process defined above determines speeds, and the times of arrival and departure for each train at each siding, based on meets at the sidings. Once a train has encountered its last meet, the final speed is adjusted to assure that it arrives at the end of the corridor as scheduled. If train $T_i$ has its last meet at siding $S_h$, then the speeds between all subsequent sidings which are required to exit the corridor as scheduled are given by $$s_{i,h} = s_{i,h+1} = \ldots = s_{i,n_s} = \qquad (10\text{-}34)$$

$$\begin{cases} \dfrac{L - b_h}{b_{i,n_s+1} - e_{ih}} & \text{for } T_i \text{ eastbound and not sided at } S_h \\ \dfrac{L - b_n - M_i}{b_{i,n_s+1} - e_{ih} - \dfrac{M_i}{v_h}} & \text{for } T_i \text{ eastbound and sided at } S_h, \text{ and} \end{cases}$$

$$s_{i,h-1} = s_{i,h-2} = \ldots = \qquad (10\text{-}35)$$

$$s_{i,1} = \begin{cases} \dfrac{a_h}{b_{i0} - e_{ih}} & \text{for } T_i \text{ westbound and not sided at } S_h \\ \dfrac{a_h - M_i}{b_{i0} - e_{ih} - \dfrac{M_i}{v_h}} & \text{for } T_i \text{ westbound and sided at } S_h. \end{cases}$$

Figure 30:
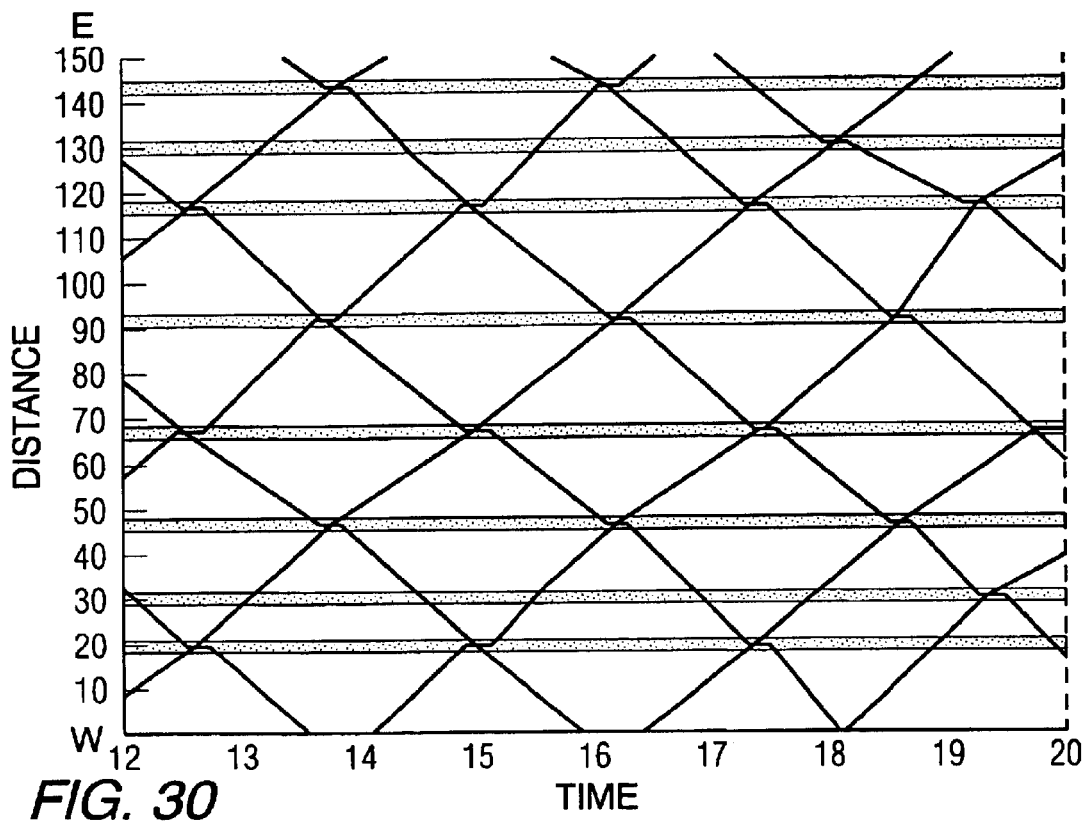
FIG. 30 is a complete string graph adjusted for centered meets and train sidings.

FIG. 30 displays a final and complete string graph which was has been adjusted for centered meets, and then for train sidings.

Figure 31:
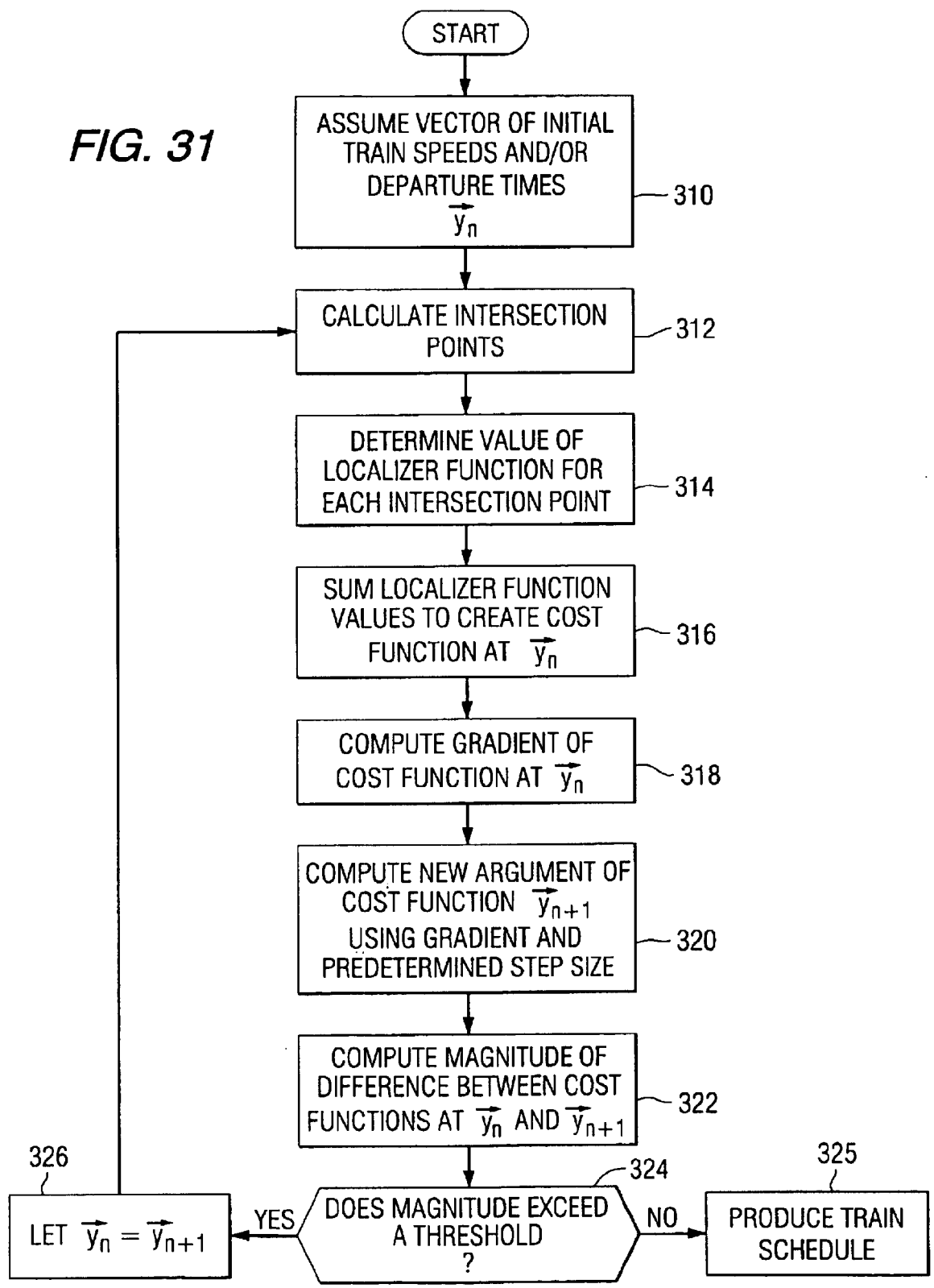
FIGS. 31 and 32 are flow charts illustrating algorithms implemented by the present invention.

FIG. 31 is a flow chart implementing one of the algorithms of the present invention. The flow chart of FIG. 31 can be processed on any special purpose or general purpose computer. The software code necessary to implement the FIG. 31 flow chart can be written by anyone who is skilled in the art of preparing software code, given the information in FIG. 31 and the description of the invention provided herein.

Processing begins at a step 310 where the initial conditions are established. That is, there is assumed an initial vector $\vec{y}_n$, which identifies either the initial train speed or the initial departure times of the trains on the corridor, or both. The vector $\vec{y}_n$ is used to calculate the intersection points at a step 312 and then the value of the localizer function for each calculated intersection point is determined at a step 314. At a step 316, the localizer function values are summed to create a schedule feasibility cost function with an argument $\vec{y}_n$. As discussed above, there are many different cost function types associated with different embodiments of the present invention. For instance, Equation 8-17 identifies two cost functions. The cost function of schedule feasibility (C) and a cost function associated with early departure effects (E). The economic cost function is defined in Equation 8-26 and the maximum speed cost function is defined in Equation 7-9. Depending upon the embodiment of the present invention, one or more of these cost functions will be used to create the cost function at the step 316.

At a step 318, the gradient of the cost function at An is calculated. At a step 320, a new argument for the cost function is created. This argument is referred to as $\vec{y}_{n+1}$ and is calculated using the gradient value from step 318 and a predetermined step size. This step size is based on the gradient value and must be determined in each situation so as to converge toward the function minimum. Reference is made to the four step process outlined at Equation 8-3. At a step 322, the magnitude of the difference between the cost function at $\vec{y}_n$ and $\vec{y}_{n+1}$ is calculated. At a decision step 324, the results from the step 322 are compared to a threshold. If the threshold is not exceeded, then the cost function minimum has been located and a schedule for the corridor is produced. This is illustrated diagrammatically at a step 325. If the threshold is exceeded, then further calculations can be performed to find the cost function minimum. At this point, processing moves to a step 326 where the previous value of $\vec{y}_n$ is now set equal to the value of $\vec{y}_{n+1}$ and processing returns to the step 312 where the intersection points are again calculated. Processing then continues through the steps 314, 316, 318, 320, and 322, followed by decision step 324 where the magnitude is again compared to the threshold value.

Figure 32:
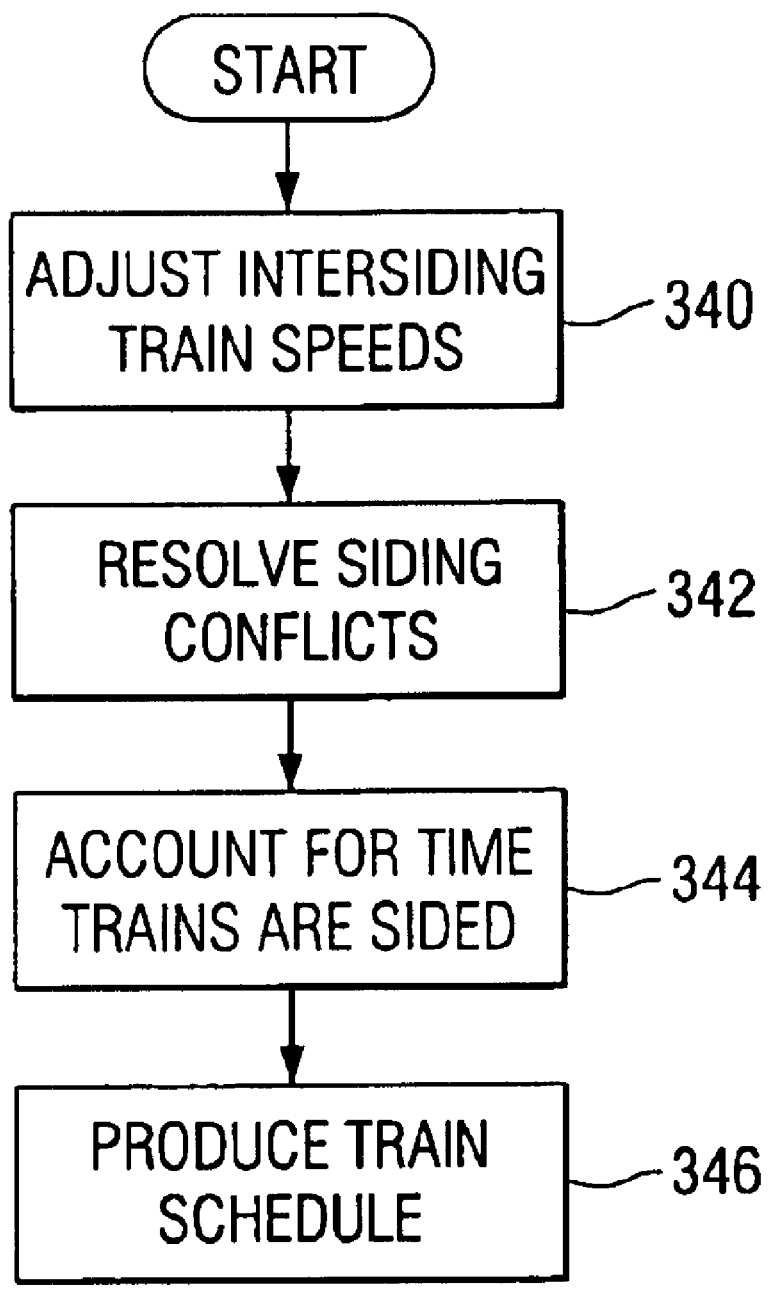

As discussed above, there are additional refinements that can be made from the schedule produced at the step 325. These refinements represent additional embodiments of the invention and are discussed in detail above. In flow chart form, they are presented in FIG. 32. In lieu of processing proceeding to the step 325 in FIG. 31 when the threshold value is not exceeded, processing can instead continue to a step 340 illustrated in FIG. 32. Here, adjustments are made to intersiding train speeds so that the intersections will occur precisely at the sidings. This embodiment is discussed in conjunction with FIGS. 15, 16 and 17. In another embodiment, siding conflicts can be resolved at a step 342. This embodiment is discussed in conjunction with FIGS. 18–24 above. The matter of accounting for the time the trains are sided is represented by a processing step 344. This embodiment is discussed above in conjunction with FIGS. 25–30. Finally, incorporation of these additional embodiments provide for the generation of another train schedule for the rail corridor, as illustrated at a step 346.

While I have shown and described embodiments in accordance with the present invention, it is understood that the same is not limited thereto but is susceptible of numerous changes and modifications as are known to a person skilled in the art. I, therefore, do not wish to be limited to the details shown and described herein, but intend to cover all such changes and modifications as are obvious to one of ordinary skill in the art.

Properties of the Sigmoid and Localizer Functions.

Lemma 1: $\sigma(x;\alpha,\beta) = \beta - \sigma(-x;\alpha,\beta)$ \hfill (A1)

Proof:

$$\beta - \sigma(-x; \alpha, \beta) = \beta\left(1 - \frac{1}{1+e^{\alpha x}}\right) = \beta\left(\frac{1+e^{\alpha x}-1}{1+e^{\alpha x}}\right) = \frac{\beta}{1+e^{-\alpha x}} = \sigma(x;\alpha,\beta)$$

Q.E.D

Lemma 2: \hfill (A2)

$$\frac{\partial}{\partial x}(\sigma(ax+b;\alpha,\beta)) = \frac{a\alpha}{\beta}\sigma(ax+b;\alpha,\beta)(\beta - \sigma(ax+b;\alpha,\beta))$$

-continued

Proof:

$$\frac{\partial}{\partial x}(\sigma(ax+b);\alpha,\beta)) = \frac{\partial}{\partial x}(\beta(1+e^{-\alpha(ax+b)})^{-1}) =$$

$$\beta(-1)(1+e^{-\alpha(ax+b)})^{-2}(-a\alpha)e^{-\alpha(ax+b)}$$

$$= \frac{a\alpha}{\beta}\sigma(ax+b;\alpha,\beta)\left(\frac{\beta e^{-\alpha(ax+b)}}{1+e^{-\alpha(ax+b)}}\right) =$$

$$\frac{a\alpha}{\beta}\sigma(ax+b;\alpha,\beta)\left(\frac{\beta}{1+e^{\alpha(ax+b)}}\right)$$

$$= \frac{a\alpha}{\beta}\sigma(ax+b;\alpha,\beta)\sigma(-(ax+b);\alpha,\beta) =$$

$$\frac{a\alpha}{\beta}\sigma(ax+b;\alpha,\beta)(\beta-\sigma(ax+b;\alpha,\beta))$$

Q.E.D

The following result follows from the derivation of the localizer function in the body of this document, and from application Lemma 2.

Lemma 3: Let $(-\infty,w),(a_1,b_1), \ldots (a_N,b_N)$ $(e,\infty)$ represent mutally disjoint intervals, with $-\infty<a_1<b_1<a_2 \ldots <a_N<\infty$. Then $L(x;\alpha,\beta)$ defined to be low if and only if x is in or near one of the intervals $(-\infty,w),(a_1,b_1), \ldots (a_N,b_N),(e,\infty)$ takes the form $$L(x;\alpha,\beta) = \beta - \sum_{i=1}^{N}[\sigma(x-b_i;\alpha,\beta)-\sigma(x-a_i;\alpha,\beta)] -$$

$$\sigma(w;\alpha,\beta) - \sigma(x-e;\alpha,\beta), \text{ and}$$

$$\frac{\partial}{\partial x}(L(x;\alpha,\beta)) = \frac{\alpha}{\beta}\Bigg\{\sum_{i=1}^{N}[\sigma(x-b_j;\alpha,\beta)(\beta-\sigma(x-b_j;\alpha,\beta)) - \sigma(x-a_j;\alpha,\beta)(\beta-\sigma(x-a_j;\alpha,\beta))] +$$

$$\sigma(w-x;\alpha,\beta)(\beta-\sigma(w-x;\alpha,\beta)) -$$

$$\sigma(x-e;\alpha,\beta)(\beta-\sigma(x-e;\alpha,\beta))\Bigg\}$$

(A3)

A Train Stopping Time Approximation

The basic formula for acceleration/deceleration of a body is $$F=MA \quad (B1),$$

where
F=the braking force applied,
M=the mass of the body,
A=the acceleration of the body.

A train has brakes on every car, and each car has mass, so we will assume that the total maximum braking force and mass are proportional to the length of the train. Therefore Equation B1 may be written as $$A=k, \quad (B2)$$

i.e., the deceleration available at maximum braking is (approximately) independent of the train's length or mass. To evaluate k, we assume that a train moving 50 mph could stop in 1 mile, therofer its average speed during (linear) deceleration would be 25 mph, and the time required to reach a full stop would be $$(1 \text{ mi.}/25 \text{ mph})(60 \text{ min}/hr)=2.4 \text{ minutes}.$$

Thus the equation relating train speed v to stopping time f(v) takes the form $$f(v)=v/A=v/k \quad (B3).$$

and 2.4 50/k, therefore k=50/2.4=20.83 (mph/min).

The final form is then $$f(v)=v/20.83 \quad (B4),$$

where f(v) is in minutes, and v is in miles per hour.

| | Variable Glossary |
|---|---|
| $A_i(t)$ | the late penalty function assessed for train $T_i$ (Equation 7-1) |
| $A_{ih}$ | the time of arrival of the end of train $T_i$ at the upstream edge of siding $S_h$ |
| $A(\vec{s},\vec{d})$ | the cost function component forcing on-time arrivals |
| $a_h$ | the distance from the west end of the corridor[1] at which siding $S_h$ begins |
| $B_{ih}$ | the decision variable as to whether train $T_i$ is sided at siding $S_h$ |
| $b_h$ | the distance from the west end of the corridor at which siding $S_i$ ends ($a_i < b_i$) |
| $C(\vec{s},\vec{d})$ | the cost function forcing trajectory intersections at sidings |
| $c_h$ | the midpoint of siding $S_h$ |
| $D_{ih}$ | the time of departure of train $T_i$ from the downstream edge of siding $S_h$ |
| $d_i$ | the departure time of train $T_i$ |
| $\vec{d}$ | the vector of dimension $n_T$ of departure times for all trains |
| E | the name of the point at the east end of the corridor |
| $E(\vec{d})$ | the cost function component preventing early train departures |
| $f_i(v)$ | the minimum stopping time of train $T_i$ at from speed v |
| $G(\vec{s},\vec{d})$ | the total scheduling cost function (Equation 7-10) |
| $H_i$ | the length of siding $S_i$ |
| $h_i$ | the step penalty cost incurred when train $T_i$ arrives late |
| I | the set of all intersections of train trajectories (even if not on the string graph) |
| L | the length of the corridor |
| $L_i$ | the line on the string graph representing the trajectory of train $T_i$ |
| L(y) | the localizer function, with minima corresponding to each siding (Equation 5-5) |
| $\tilde{L}(y)$ | the balanced localizer function (Equation 5-7) |
| $L_{ij}(y_{ij})$ | the localizer modified so trains $T_i$ and $T_j$ won't meet where neither can side |
| $M_i$ | the length of train $T_i$ |
| $m_i$ | the late penalty per time unit when train $T_i$ arrives late |
| $n_s$ | the number of sidings along the corridor |
| $n_T$ | the number of trains involved in the optimization |
| p(i,h) | the siding prior to $S_h$ at which train $T_i$ had a meet, |
| $S_i$ | the designator for the i-th siding, traveling eastward on the corridor |
| $s_i$ | the speed of train $T_i$ |
| $s_i^{(max)}$ | maximum speed permitted for train $T_i$ |
| $s_{ih}$ | train $T_i$'s speed between the downstream edges of sidings $S_h$ and $S_{h+1}$ |
| $\vec{s}$ | the vector of dimension $n_T$ of speeds for all train |
| $T_i$ | the designator for the i-th train |
| $T_{ij}$ | the set of all sidings where at least one of trains $T_i$ and $T_j$ can side |
| $t_i$ | the arrival time at which train $T_i$ begins to incur late penalties |
| $t_{jh}$ | the time at which train $T_j$, if not sided at $S_h$, reaches $c_h$. |
| $t_{ij}$ | the time coordinate associated with trajectory intersection point $y_{ij}$ |
| $V(\vec{s})$ | the cost function component which limits train speeds |
| $v_h$ | the pullin/pullout speed for trains at siding $S_h$ |
| W | the name of the point at the west end of the corridor (zero on the distance axis) |
| $y_{ij}$ | the distance from the west end of the corridor at which trains $T_i$ and $T_j$ intersect |
| $\vec{y}$ | the vector of all trajectory intersection points $y_{ij}$ |

-continued

Variable Glossary

| | |
|---|---|
| $\alpha$ | the sigmoid function parameter controlling steepness of rise (Equation 4-1) |
| $\beta$ | the horizontal asymptote of the sigmoid function (Equation 4-1) |
| $\eta_1$ | the weight applied to the feasibility component $C(\hat{s}, \hat{d})$ of the cost function |
| $\eta_2$ | the weight applied to the late arrival component $A(\hat{s}, \hat{d})$ of the cost function |
| $\eta_3$ | the weight applied to the early departure component. $E(\hat{d})$ of the cost function |
| $\eta_4$ | the weight applied to the maximum speed component $V(\hat{s})$ of the cost function |
| $\theta_i$ | a variable denoting the direction of train $T_i$, 0 if eastbound, 1 if westbound |
| $\sigma(x)$ | the sigmoid function (Equation 4-1) |

What is claimed is:

1. A method for scheduling the movement of a plurality of trains operating on a rail corridor, wherein trains traversing the rail corridor may intersect on the same track, whereby each train has at least one travel parameter that can be varied, whereby the rail corridor includes at least one main line and a plurality of secondary tracks onto which a train may be moved to avoid an intersection with another train, said method comprising the steps of:
   (a) deriving a localizer function to represent the rail corridor, wherein said localizer function has a value in a first range between secondary tracks and has a value in a second range in the vicinity of each secondary track;
   (b) selecting a value for at least one travel parameter for each of the plurality of trains set to travel on the rail corridor in accordance with a schedule;
   (c) finding the intersection points for the plurality of trains;
   (d) determining the value of said localizer function for each one of the intersection points;
   (e) determining a cost function value in response to the said value of said localizer functions, wherein the cost function value indicates whether the trains intersect at or near a junction between the main line and one of the plurality of secondary tracks;
   (f) revising the schedule such that the cost function value indicates that train intersections occur at or near the junction between a main line and one of the plurality of secondary tracks; and
   (g) providing the schedule to at least one of the plurality of trains for directing its movement along the rail corridor; and
   (h) wherein the steps (a) through (f) are executed by a computing device.

2. The method of claim 1 wherein the travel parameter includes train speed.

3. The method of claim 2 wherein the speed of at least one train is varied between intersection points to ensure the intersection occurs at a secondary track.

4. The method of claim 1 wherein the travel parameter includes the entry time of the train onto the rail corridor.

5. The method of claim 1 wherein the travel parameter includes train speed and the entry time of the train onto the rail corridor.

6. The method of claim 1 wherein the secondary track includes a passing siding.

7. The method of claim 1 wherein the secondary track includes two parallel tracks with crossover switches therebetween.

8. The method of claim 1 wherein the localizer function is derived by summing a plurality of sigmoid functions, wherein said sigmoid functions are translated and inverted with respect to each other and the location of the secondary tracks such that the localizer function has a value in the first range between secondary tracks and has a value within the second range in the vicinity of each secondary track.

9. The method of claim 1 including the step of forming a first vector wherein the elements of the first vector comprise the values selected in step (b), and wherein step (f) includes:
   (f1) determining the gradient of the cost function of the first vector;
   (f2) calculating a second vector by subtracting the product of a predetermined step size and the gradient calculated in step (f1), from the first vector;
   (f3) calculating the cost function value of the second vector;
   (f4) calculating the magnitude of the difference between the cost function value calculated in step (e) and the cost function value calculated in step (f);
   (f5) if the result of step (f4) is greater than a predetermined threshold, returning to step (f1) wherein the second vector is now used in lieu of the first vector in the gradient calculating step (f1).

10. The method of claim 1 wherein the localizer function of step (a) is modified to account for rail corridor end points by setting the localizer function value to a value within the first range beyond the end points of the rail corridor.

11. The method of claim 1 wherein step (e) includes the process of summing said localizer function values to create the cost function value.

12. An apparatus for scheduling the movement of a plurality of trains operating on a rail corridor, wherein trains traversing the rail corridor may intersect on the same track, whereby each train has at least one travel parameter that can be varied, whereby the rail corridor includes at least one main line and a plurality of secondary tracks onto which a train may be moved to avoid an intersection with another train, said apparatus comprising:
   means for deriving a localizer function to represent the rail corridor, wherein said localizer function has a value within a first range between secondary tracks and has a value within a second range in the vicinity of each secondary track;
   means for selecting a value for at least one travel parameter for each of the plurality of trains set to travel on the rail corridor in accordance with a schedule;
   means for finding the intersection points for the plurality of trains;
   means for determining the value of said localizer function for each one of the intersection points;
   means for determining a cost function value in response to said value of said localizer functions, wherein the cost function value indicates whether the trains intersect at or near a junction between the main line and one of the plurality of secondary tracks; and
   means for revising the schedule such that the cost function value indicates that train intersections occur at or near the junction between a main line and one of the plurality of secondary tracks.

13. The apparatus of claim 12 wherein the travel parameter includes train speed.

14. The apparatus of claim 13 including means for adjusting the speed of at least one train between intersection points to ensure that the intersection occurs at a secondary track.

15. The apparatus of claim 12 wherein the travel parameter includes the entry time of the train onto the rail corridor.

16. The apparatus of claim 12 wherein the travel parameter includes train speed and the entry time of the train onto the rail corridor.

17. The apparatus of claim 12 wherein the secondary track includes a passing siding.

18. The apparatus of claim 12 wherein the secondary track includes two parallel tracks with crossover switches therebetween.

19. The apparatus of claim 12 wherein the localizer function is derived by summing a plurality of sigmoid functions, wherein said sigmoid functions are disposed with respect to each other and the location of the secondary tracks such that the localizer function has a value within the first range between secondary tracks and has a value within the second range in the vicinity of each secondary track.

20. The apparatus of claim 12 including:
means for forming a first vector wherein the elements of the first vector comprise the selected values, and further including:
means for determining the gradient of the cost function of the first vector;
means for calculating a second vector by subtracting the product of a predetermined step size and the gradient calculated, from the first vector;
means for calculating the value of the cost function of the second vector;
means for calculating the magnitude of the difference between the cost function value based on the first vector and the cost function value based on the second vector;
means for determining if the magnitude of the difference is greater than a predetermined threshold; and
means for recalculating the gradient when the magnitude of the difference is greater than a predetermined threshold, wherein the second vector is used in lieu of the first vector in the gradient recalculation.

21. The apparatus of claim 12 wherein the localizer function is modified to account for rail corridor end points by setting the localizer function value to a value within the first range beyond the end points of the rail corridor.

22. The apparatus of claim 12 wherein means for combining includes means for summing said localizer function values to create the cost function value.

23. A method for scheduling the movement of a plurality of trains operating on a rail corridor to minimize train delays, wherein trains traversing the rail corridor may intersect, whereby each train has at least one travel parameter that can be varied, whereby the rail corridor includes at least one mainline track and a plurality of secondary tracks onto which a train traversing the mainline track may be moved to avoid an intersection with another train traversing the mainline track, said method comprising the steps of:

(a) selecting a value for at least one travel parameter for each of the plurality of trains set to travel on the rail corridor in accordance with a schedule;

(b) determining a cost function, wherein at least one independent variable of the cost function comprises a travel parameter, and wherein the cost function indicates whether the trains intersect at or near a junction between a mainline track and a secondary track;

(c) determining a value of the cost function that minimizes the train delays;

(d) determining the travel parameters associated with the value of the cost function determined at the step (c);

(e) revising the schedule in accordance with the travel parameters determined at the step (d) such that the cost function indicates that train intersections occur at or near the junction between a mainline track and a secondary track; and (f) providing the schedule to at least one of the plurality of trains for directing its movement along the rail corridor; and (g) wherein the steps (a) through (e) are executed by a computing device.

* * * * *